US011415179B2

(12) United States Patent
Wellman et al.

(10) Patent No.: US 11,415,179 B2
(45) Date of Patent: Aug. 16, 2022

(54) IMPACT RESISTANT TIE ROD BOOT

(71) Applicant: BRC Rubber and Plastics, Inc., Fort Wayne, IN (US)

(72) Inventors: Gary L Wellman, Fort Wayne, IN (US); Gregory F Velpel, Fort Wayne, IN (US); Robert K Wagner, Fort Wayne, IN (US)

(73) Assignee: BRC Rubber and Plastics, Inc., Fort Wayne, IN (US)

( * ) Notice: Subject to any disclaimer, the term of this patent is extended or adjusted under 35 U.S.C. 154(b) by 479 days.

(21) Appl. No.: 16/540,002

(22) Filed: Aug. 13, 2019

(65) Prior Publication Data

US 2021/0048073 A1    Feb. 18, 2021

(51) Int. Cl.
*F16C 11/06* (2006.01)
*F16D 3/84* (2006.01)
*B62D 7/16* (2006.01)

(52) U.S. Cl.
CPC .......... *F16D 3/845* (2013.01); *F16C 11/0671* (2013.01); *B62D 7/163* (2013.01); *F16C 2326/05* (2013.01)

(58) Field of Classification Search
CPC ........... F16J 3/04; F16J 3/042; F16C 11/0666; F16C 11/0661; F16C 11/0671
See application file for complete search history.

(56) References Cited

U.S. PATENT DOCUMENTS

| | | | |
|---|---|---|---|
| 1,902,323 A | 3/1933 | De Monge | |
| 3,063,266 A | 11/1962 | Rabson | |
| 3,703,342 A * | 11/1972 | O'Connor | F16J 3/041 417/326 |
| 4,676,513 A * | 6/1987 | Tiegs | F16D 3/845 74/18 |
| 4,702,483 A | 10/1987 | Ukai et al. | |
| 4,957,469 A | 9/1990 | Zollinger | |
| 5,098,344 A | 3/1992 | Zollinger | |
| 6,227,748 B1 * | 5/2001 | Hayward | F16J 3/042 403/50 |
| 10,578,213 B2 * | 3/2020 | Larson | F16J 3/041 |
| 2004/0116193 A1 * | 6/2004 | Toriumi | F16J 3/042 464/175 |
| 2004/0232630 A1 | 11/2004 | Gasper | |

(Continued)

*Primary Examiner* — Vishal A Patel
*Assistant Examiner* — Thomas L Neubauer
(74) *Attorney, Agent, or Firm* — George Pappas; Barrett McNagny LLP

(57) ABSTRACT

A tie rod boot includes a minimally thick accordion shaped bellows section. One terminal end of the boot is secured to a steering mechanism and the other is secured to a tie rod. Protuberances are provided and are strategically located on the bellows walls for resisting impacts from rocks and other debris and minimizing holes through the tie rod. When the bellows is retracted and pairs of opposing bellows walls collapse towards each other, the protuberances of adjacent opposing walls nest with each other and contact the opposing wall. The protuberances can be step shaped rings or a ring of discrete protuberances which are step shaped or both. The step shaped protuberances are defined by a riser surface extending along a plane which is substantially perpendicular to the longitudinal axis of the boot and a tread annular surface which is substantially parallel with the longitudinal axis.

16 Claims, 21 Drawing Sheets

(56) References Cited

U.S. PATENT DOCUMENTS

| | | |
|---|---|---|
| 2005/0236779 A1 | 10/2005 | You |
| 2007/0225081 A1 | 9/2007 | Toriumi |
| 2014/0125015 A1* | 5/2014 | Choi ................... F16J 15/021 |
| | | 277/634 |
| 2014/0294486 A1* | 10/2014 | Staade .................. B62D 7/16 |
| | | 403/113 |
| 2020/0400233 A1* | 12/2020 | Hrones ................. B29C 35/02 |
| 2021/0123481 A1* | 4/2021 | Yoshinaga ............ F16J 15/525 |

* cited by examiner

IMPACT RESISTANT TIE ROD BOOT

BACKGROUND OF THE INVENTION

1. Field of the Invention

The present invention relates to the field of land vehicle steering assemblies. More particularly, the present invention relates to a tie rod boot for surrounding and protecting a tie rod of a steering assembly.

2. Background

Tie rod boots are today commonly used in steering assemblies for protecting the tie rod from the elements to which the steering assembly is exposed and thereby maintaining the steering assembly in good working order and lengthening the life thereof. The tie rod boot is typically cylindrically shaped and is installed in the steering assembly surrounding the tie rod. One terminal end of the tie rod boot is secured to the steering mechanism (typically a rack and pinion or other gearbox) and the other terminal end thereof secured to the tie rod. The cylindrical section of the tie rod is accordion/bellows shaped allowing the tie rod boot to be longitudinally extended and retracted together with the tie rod as the tie rod is extended from and retracted into the steering mechanism.

Although prior tie rod boots have functioned adequately for protecting the tie rod from the elements, they are often punctured by rocks and/or other debris to which the steering assembly is exposed. Water and other debris enters through the punctured hole into the interior of the tie rod boot thereby damaging the tie rod and steering mechanism and causing premature failure.

Accordingly, a need exists for an improved tie rod boot which resists impacts from rocks and other debris and minimizes potential holes therethrough while minimizing the longitudinal forces required for extending and retracting from its neutral state and being economically manufacturable.

SUMMARY OF THE INVENTION

The present invention overcomes disadvantageous of prior tie rod boots by providing a tie rod boot having minimally thick accordion shaped bellows section for minimizing costs and the forces required to extend and retract the boot, and including protuberances on the bellows walls which are strategically located and shaped for resisting impacts from rocks and other debris and minimizing potential damaging holes therethrough and, also, for being economically injection molded with a two part clamp mold and a central mandrel.

In one form thereof, the present invention is directed to a tie rod boot formed having a cylindrical tubular body including a bellows section between longitudinal terminal ends. A steering mechanism attachment ring is provided at the cylindrical tubular body one longitudinal terminal end whereby the tubular body can be secured to a steering mechanism. A tie rod attachment ring is provided at the cylindrical tubular body other one longitudinal terminal end whereby the tubular body can be secured to a tie rod adapted to be extended from and retracted into the steering mechanism. The cylindrical tubular body is made up of a plurality of annulus walls having a minor diameter and a major diameter, wherein pairs of adjacent annulus walls are joined at their minor diameter and pairs of adjacent annulus walls are joined at their major diameter thereby forming a tubular bellows with alternating annular peaks and annular valleys with the annulus walls extending between the peaks and valleys. A first ring shaped protuberance is provided on a first annulus wall. A second ring shaped protuberance is provided on a second annulus wall which is adjacent to and opposing the first annulus wall. The first ring shaped protuberance is smaller in diameter than the second ring shaped protuberance whereby, when the cylindrical tubular body is longitudinally retracted and the first and second annulus walls are collapsed towards each other, the first ring shaped protuberance contacts the second annulus wall and the second ring shaped protuberance contacts the first annulus wall.

Preferably, when the cylindrical tubular body is in a neutral state, the first and second ring shaped protuberances are step shaped and are defined by a riser surface in a plane substantially perpendicular to a longitudinal axis of the cylindrical tubular body and a tread annular surface substantially parallel with the longitudinal axis. The major diameter of the first annulus wall can be smaller than the major diameter of the second annulus wall.

In another form thereof, the present invention is directed to a tie rod boot formed having a cylindrical tubular body including a bellows section between longitudinal terminal ends. A steering mechanism attachment ring is provided at the cylindrical tubular body one longitudinal terminal end whereby the tubular body can be secured to a steering mechanism. A tie rod attachment ring is provided at the cylindrical tubular body other one longitudinal terminal end whereby the tubular body can be secured to a tie rod adapted to be extended from and retracted into the steering mechanism. The cylindrical tubular body is made up of a plurality of annulus walls having a minor diameter and a major diameter, wherein pairs of adjacent annulus walls are joined at their minor diameter and pairs of adjacent annulus walls are joined at their major diameter thereby forming a tubular bellows with alternating annular peaks and annular valleys with the annulus walls extending between the peaks and valleys. A first ring of discrete protuberances are provided on a first annulus wall. A second ring of discrete protuberance are provided on a second annulus wall which is adjacent to and opposing the first annulus wall. The first ring of discrete protuberances is defined by a first diameter and the second ring of discrete protuberances is defined by a second diameter which is substantially the same as the first diameter. The first ring of discrete protuberances are circumferentially shifted relative to the second ring of discrete protuberances whereby, when the cylindrical tubular body is longitudinally retracted and the first and second annulus walls are collapsed towards each other, the first ring of discrete protuberances contacts the second annulus wall and the second ring of discrete protuberances contacts the first annulus wall.

Preferably, when the cylindrical tubular body is in a neutral state, the discrete protuberances are step shaped and are defined by a riser surface in a plane substantially perpendicular to a longitudinal axis of the cylindrical tubular body and a tread annular surface substantially parallel with the longitudinal axis. Also preferably, each discrete protuberance terminates in a surface which is in a plane substantially perpendicular to the longitudinal axis.

The tie rod boot can further include: a third ring of discrete protuberances on the first annulus wall; a fourth ring of discrete protuberance on the second annulus wall which is adjacent to and opposing the first annulus wall; wherein the third ring of discrete protuberances is defined by a third diameter and the fourth ring of discrete protuberances is defined by a fourth diameter which is substantially the same as the third diameter; wherein the third and fourth diameters are smaller than the first and second diameters; and, wherein the third ring of discrete protuberances are circumferentially shifted relative to the fourth ring of discrete protuberances whereby, when the cylindrical tubular body is longitudinally retracted and the first and second annulus walls are collapsed towards each other, the third ring of discrete protuberances contacts the second annulus wall and the fourth ring of discrete protuberances contacts the first annulus wall.

In yet another form thereof, the present invention is directed to a tie rod boot formed having a cylindrical tubular body including a bellows section between longitudinal terminal ends. A steering mechanism attachment ring is provided at the cylindrical tubular body one longitudinal terminal end whereby the tubular body can be secured to a steering mechanism. A tie rod attachment ring is provided at the cylindrical tubular body other one longitudinal terminal end whereby the tubular body can be secured to a tie rod adapted to be extended from and retracted into the steering mechanism. The cylindrical tubular body includes a plurality of annulus walls having a minor diameter and a major diameter, wherein pairs of adjacent annulus walls are joined at their minor diameter and pairs of adjacent annulus walls are joined at their major diameter thereby forming a tubular bellows with alternating annular peaks and annular valleys with the annulus walls extending between the peaks and valleys. A first section of the cylindrical tubular wall comprises: a first ring shaped protuberance on a first annulus wall; a second ring shaped protuberance on a second annulus wall which is adjacent to and opposing the first annulus wall; and, wherein the first ring shaped protuberance is smaller in diameter than the second ring shaped protuberance whereby, when the cylindrical tubular body is longitudinally retracted and the first and second annulus walls are collapsed towards each other, the first ring shaped protuberance contacts the second annulus wall and the second ring shaped protuberance contacts the first annulus wall. A second section of the cylindrical tubular wall includes: a first ring of discrete protuberances on a first annulus wall; a second ring of discrete protuberance on a second annulus wall which is adjacent to and opposing the first annulus wall; wherein the first ring of discrete protuberances is defined by a first diameter and the second ring of discrete protuberances is defined by a second diameter which is substantially the same as the first diameter; and, wherein the first ring of discrete protuberances are circumferentially shifted relative to the second ring of discrete protuberances whereby, when the cylindrical tubular body is longitudinally retracted and the first and second annulus walls are collapsed towards each other, the first ring of discrete protuberances contacts the second annulus wall and the second ring of discrete protuberances contacts the first annulus wall.

Preferably, when the cylindrical tubular body is in a neutral state, the first and second ring shaped protuberances and the first and discrete protuberances are step shaped and are defined by a riser surface in a plane substantially perpendicular to a longitudinal axis of the cylindrical tubular body and a tread annular surface substantially parallel with the longitudinal axis. Also preferably, each discrete protuberance terminates in a surface which is in a plane substantially perpendicular to the longitudinal axis. Yet more preferably, the second section of the cylindrical tubular wall further includes: a third ring of discrete protuberances on the first annulus wall; a fourth ring of discrete protuberance on the second annulus wall which is adjacent to and opposing the first annulus wall; wherein the third ring of discrete protuberances is defined by a third diameter and the fourth ring of discrete protuberances is defined by a fourth diameter which is substantially the same as the third diameter; wherein the third and fourth diameters are smaller than the first and second diameters; and, wherein the third ring of discrete protuberances are circumferentially shifted relative to the fourth ring of discrete protuberances whereby, when the cylindrical tubular body is longitudinally retracted and the first and second annulus walls are collapsed towards each other, the third ring of discrete protuberances contacts the second annulus wall and the fourth ring of discrete protuberances contacts the first annulus wall.

BRIEF DESCRIPTION OF THE DRAWINGS

The above mentioned and other features and objects of this invention, and the manner of attaining them, will become more apparent and the invention itself will be better understood by reference to the following description of the embodiments of the invention taken in conjunction with the accompanying drawings, wherein.

Figure 1:
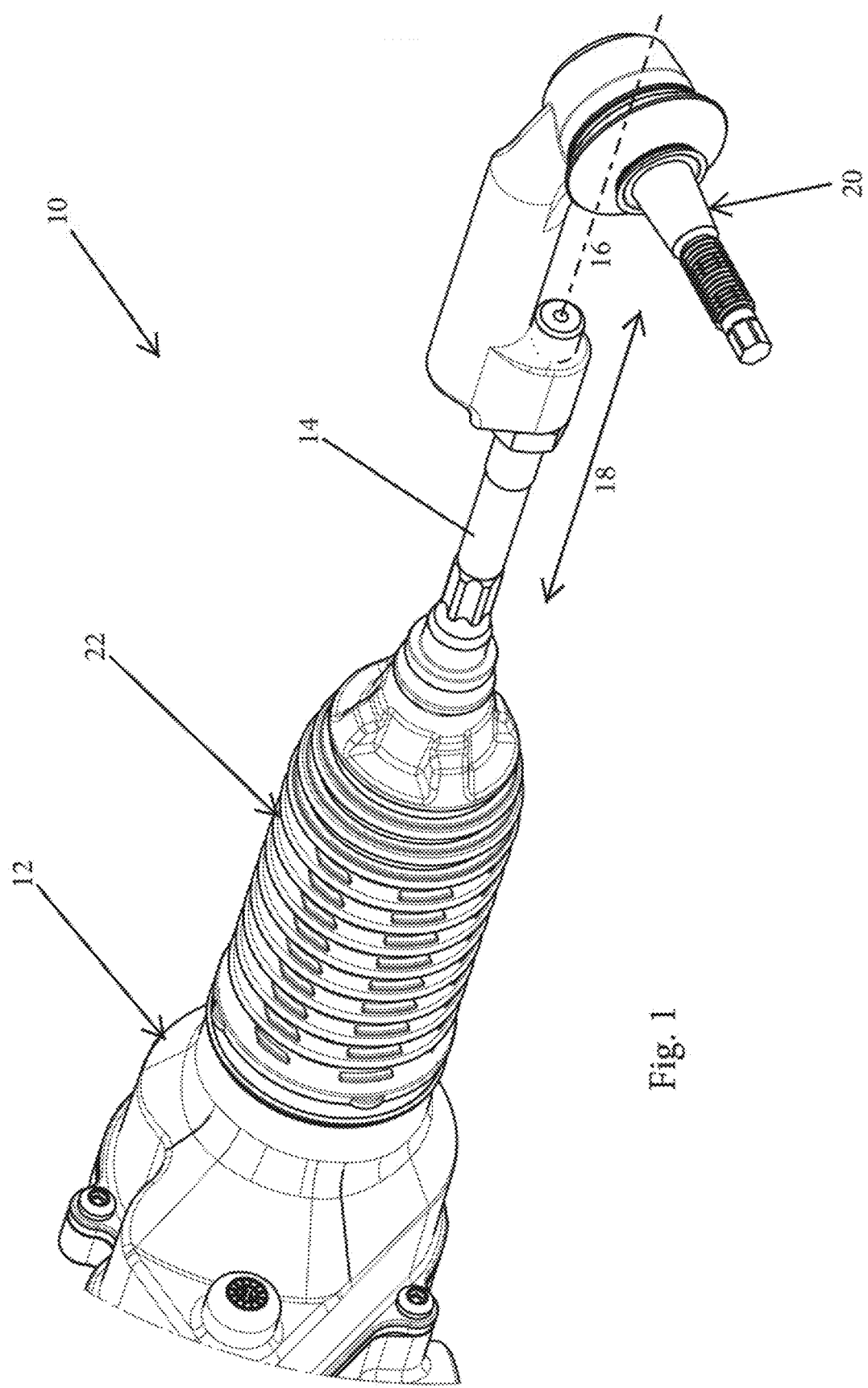
FIG. 1 is an isometric view of part of a steering assembly of a land vehicle showing a tie rod boot constructed in accordance with the principals of the present invention and secured to a steering mechanism at one end and a tie rod at its other end.
Figure 2:
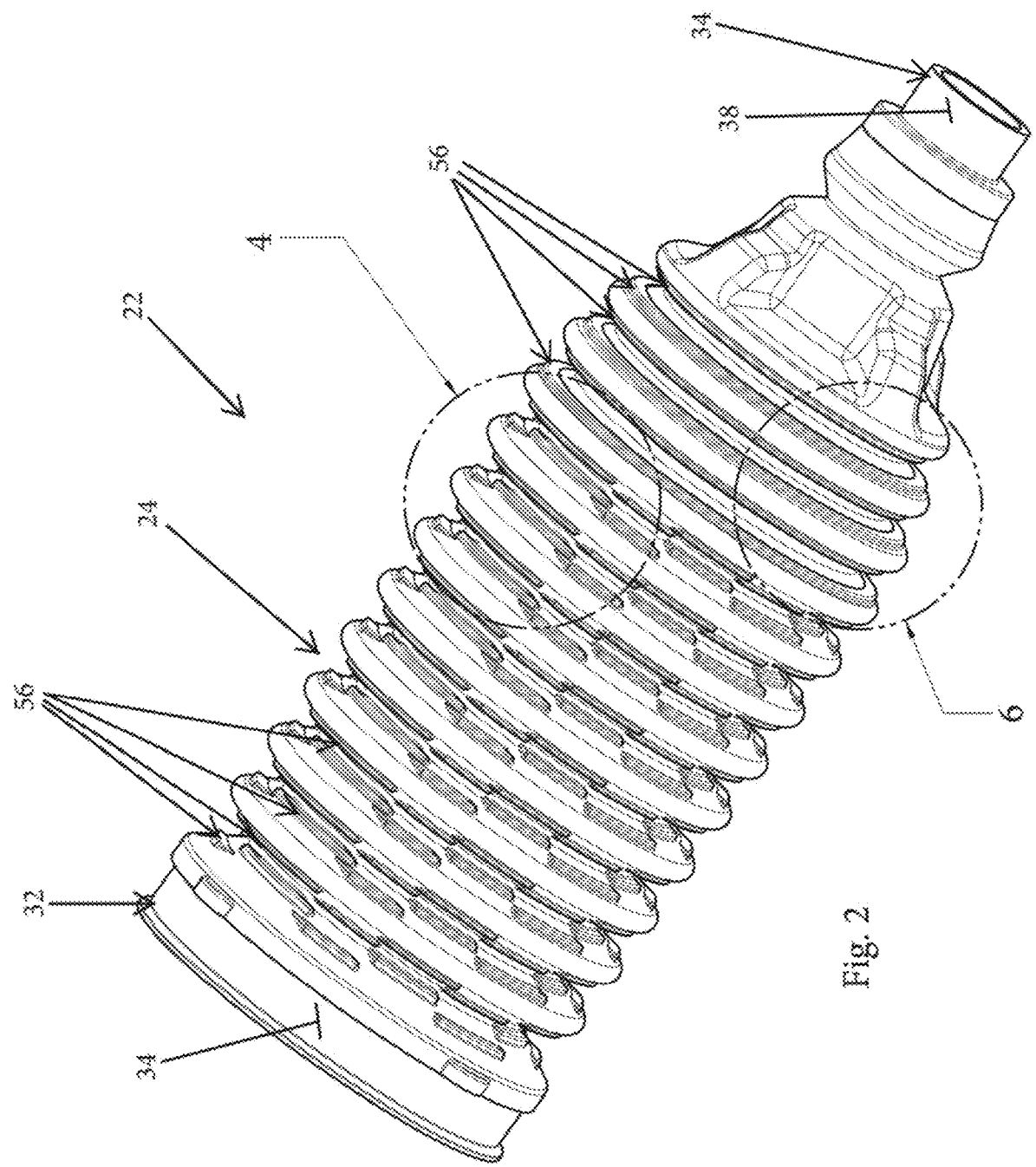
FIG. 2 is an isometric view of the tie rod boot shown in FIG. 1.
Figure 3:
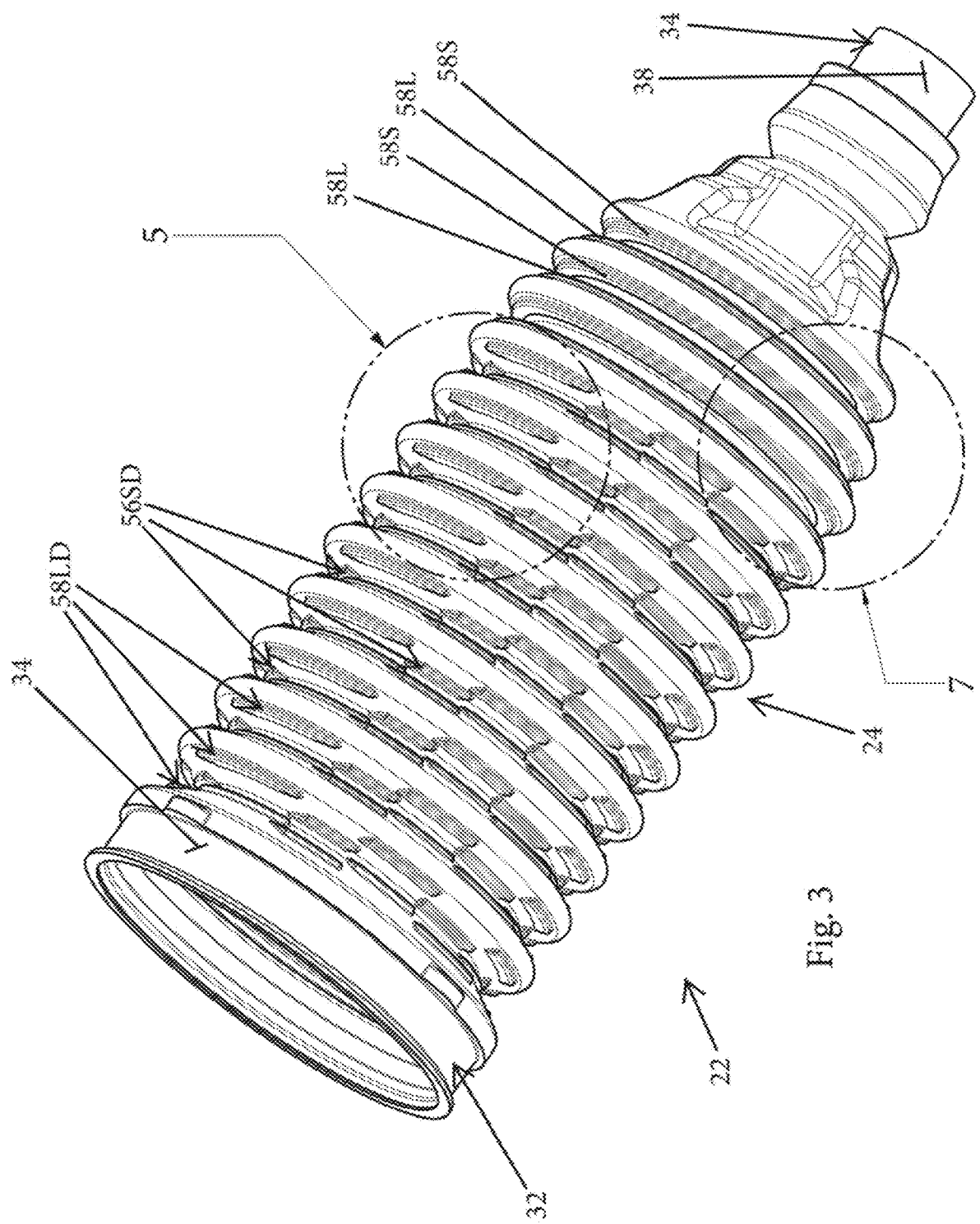
FIG. 3 is another isometric view of the tie rod boot shown in FIG. 1.
Figure 4:
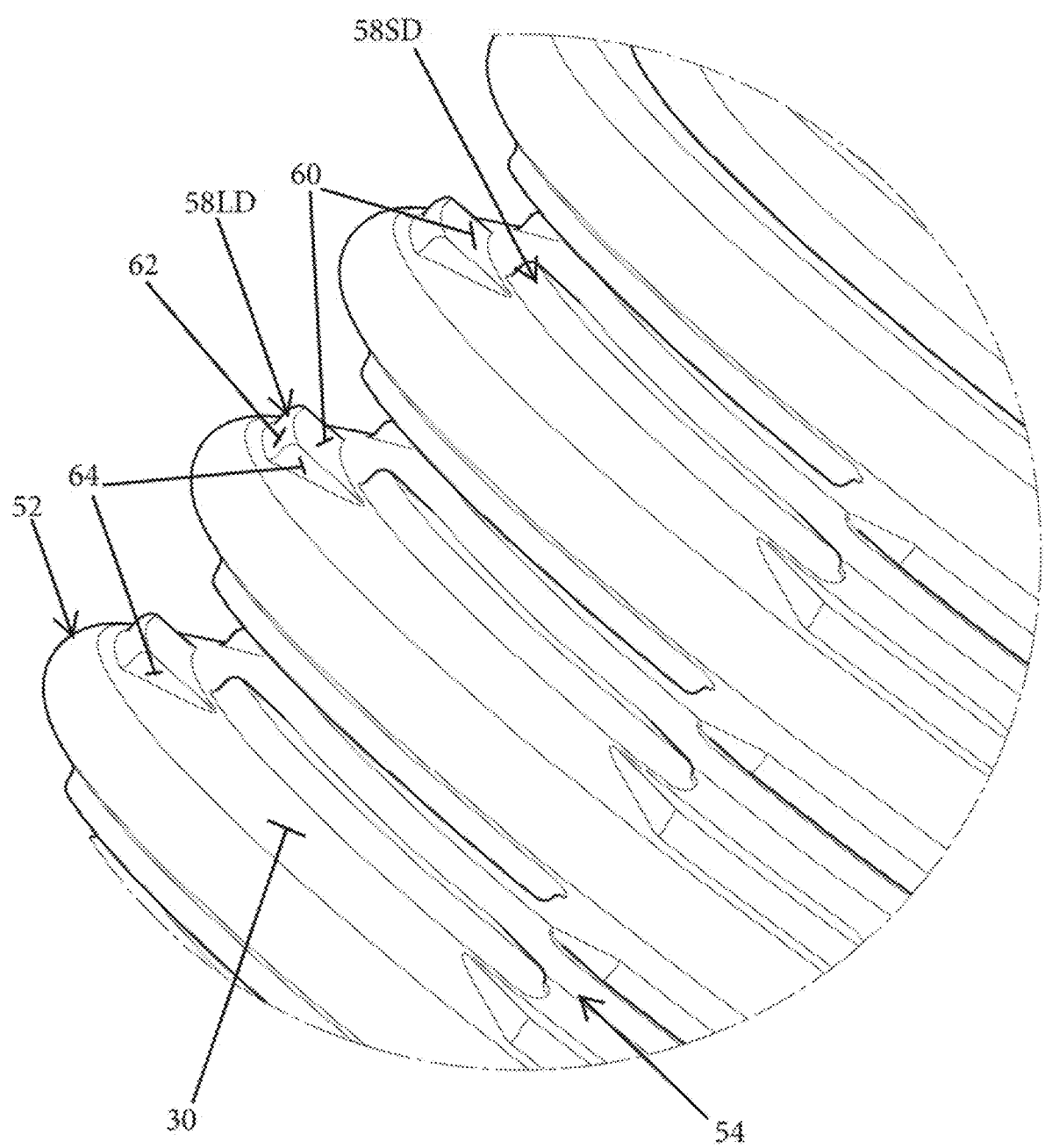
FIG. 4 is a detail enlarged view of the circled area designated by the numeral 4 in FIG. 2.
Figure 5:
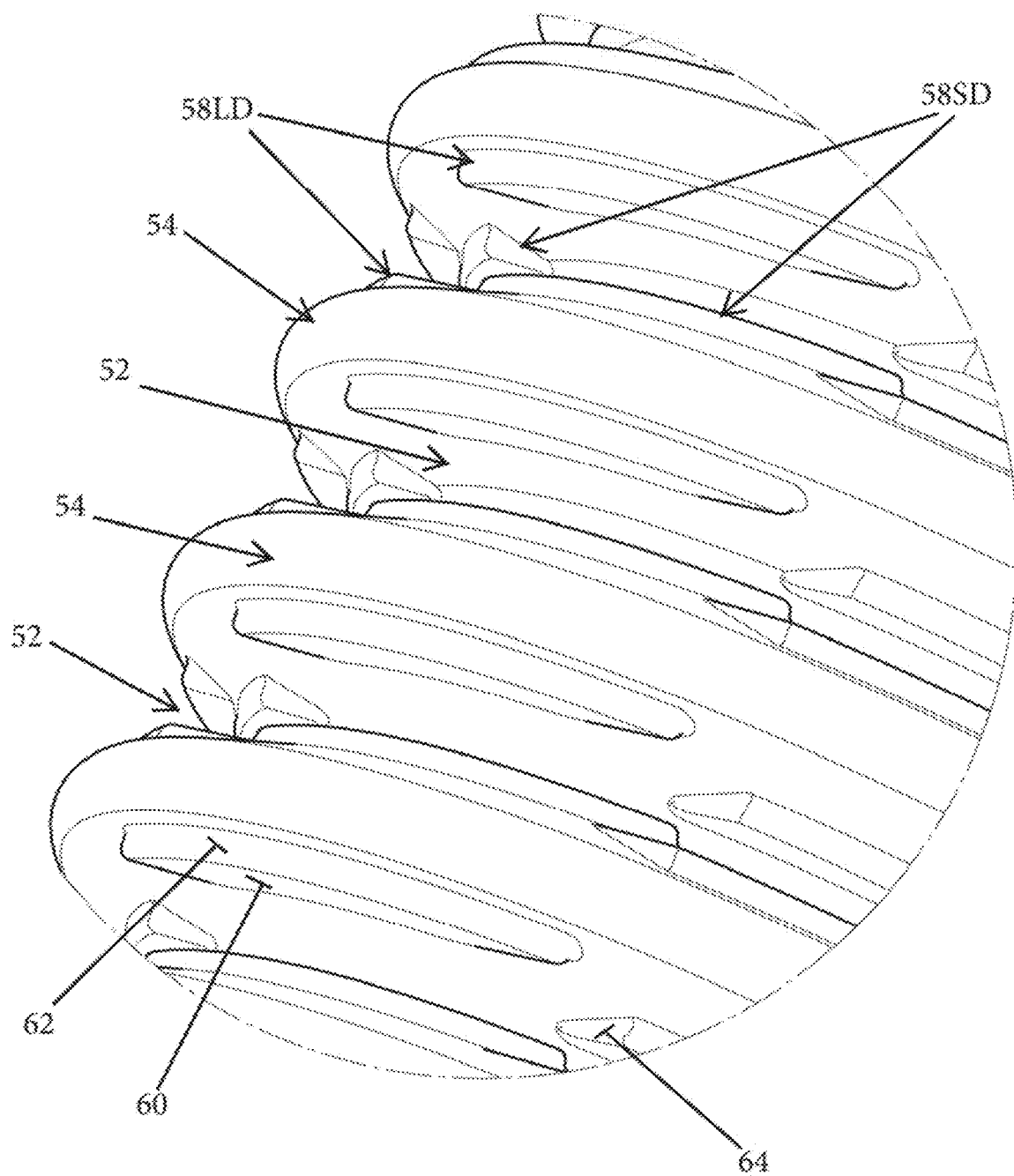
FIG. 5 is a detail enlarged view of the circled area designated by the numeral 5 in FIG. 3.
Figure 6:
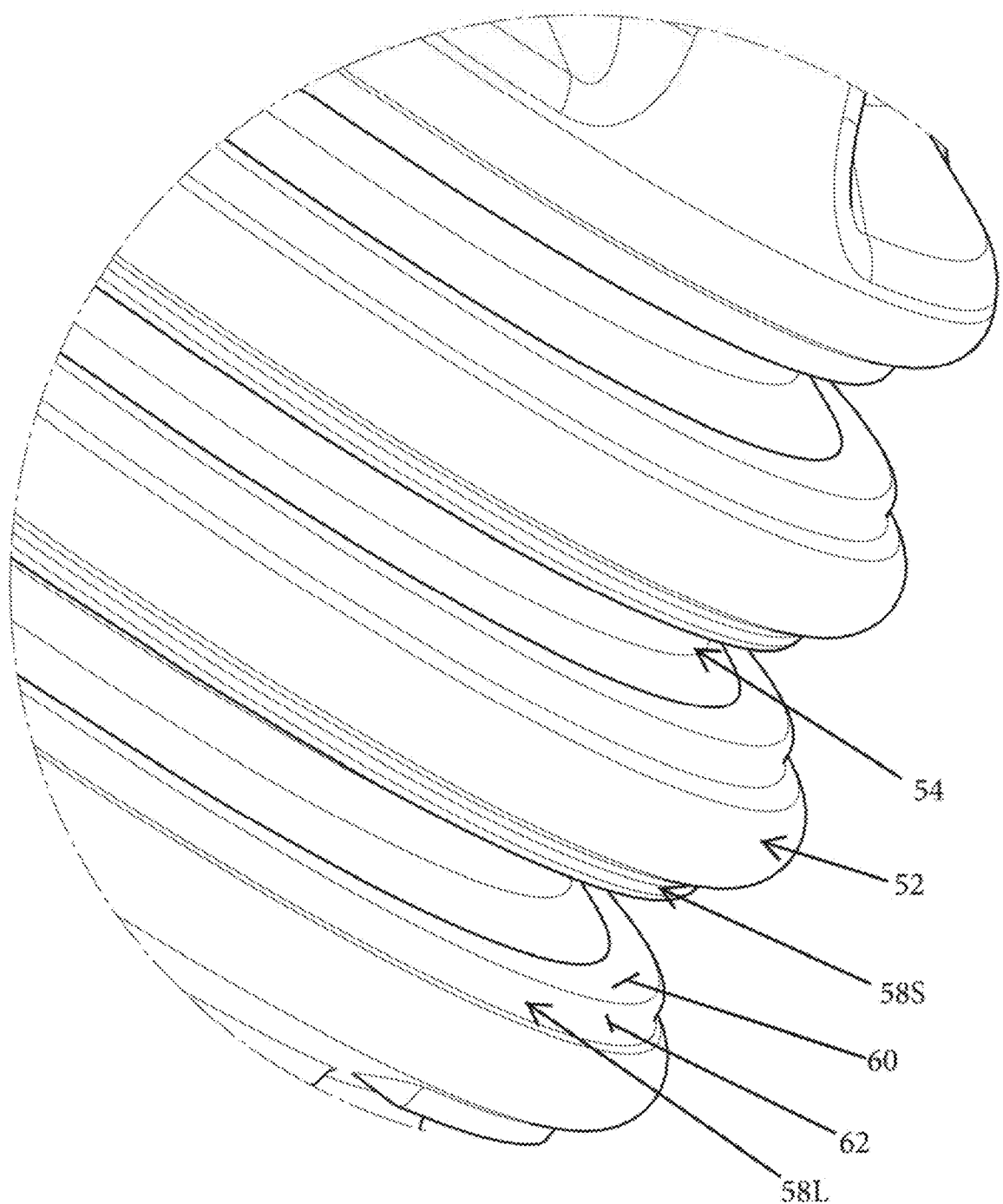
FIG. 6 is a detail enlarged view of the circled area designated by the numeral 6 in FIG. 2.
Figure 7:
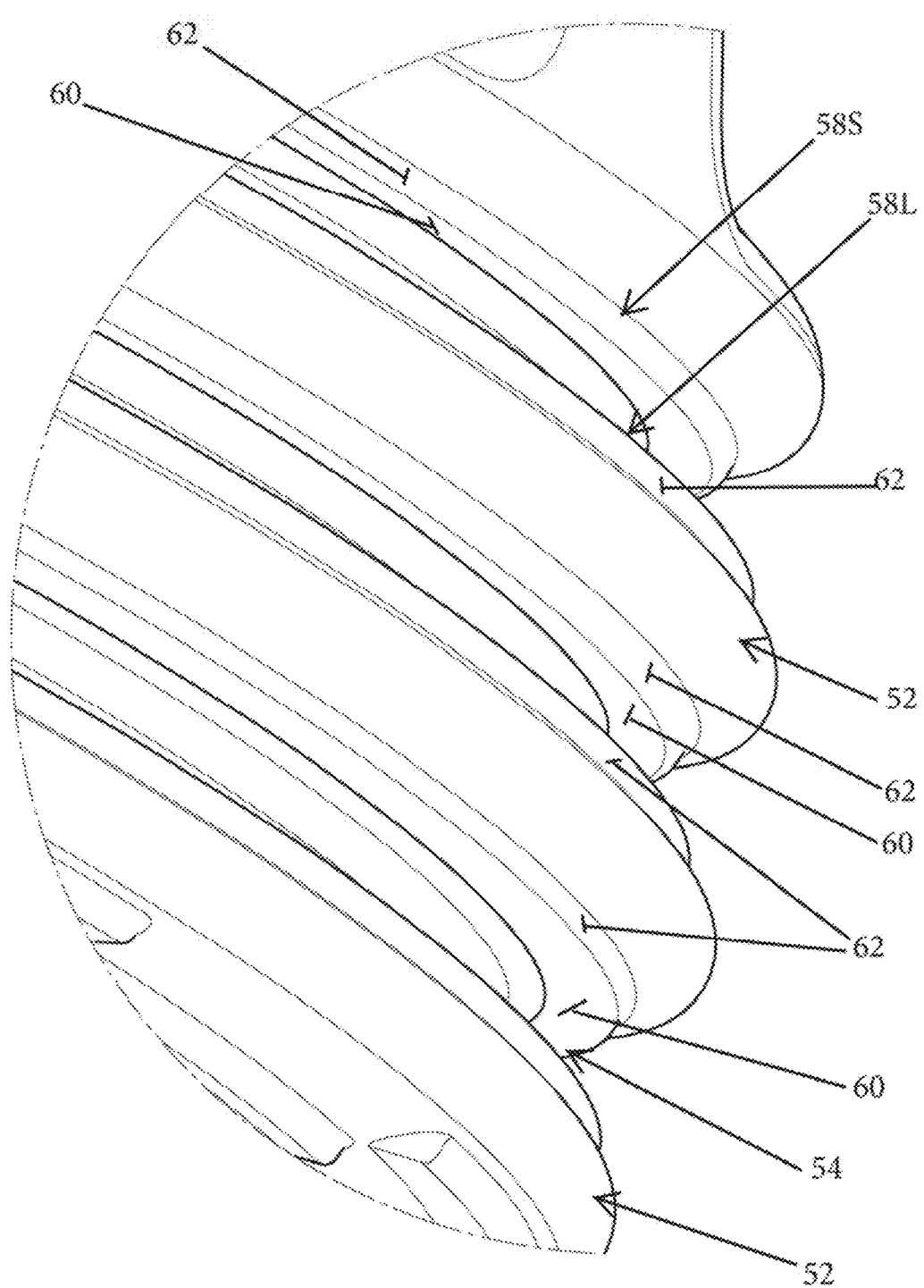
FIG. 7 is a detail enlarged view of the circled area designated by the numeral 7 in FIG. 3.
Figure 8:
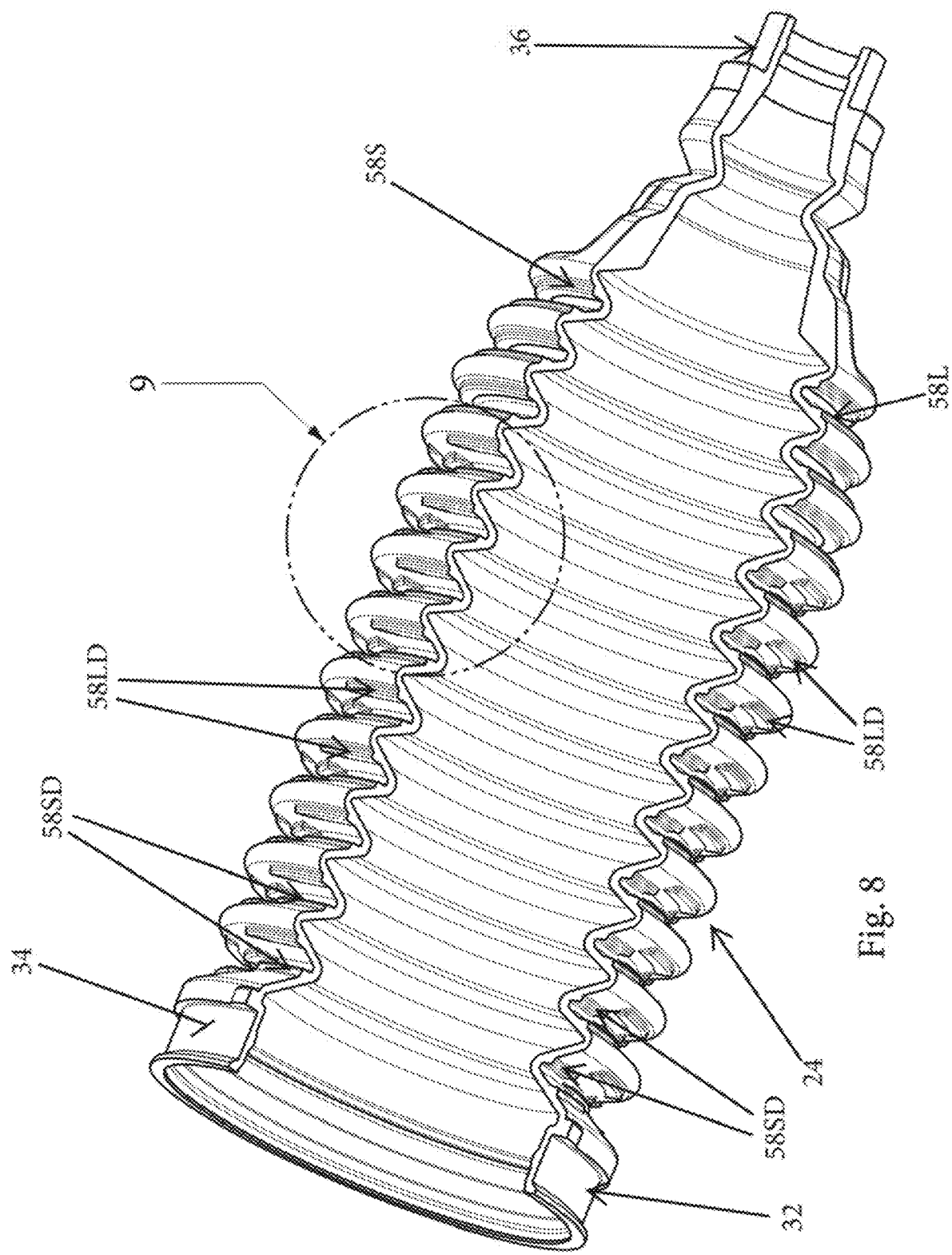
FIG. 8 is an isometric view of the tie rod boot shown in FIG. 1 with part of the tubular body thereof removed and showing the interior of the tie rod boot.
Figure 9:
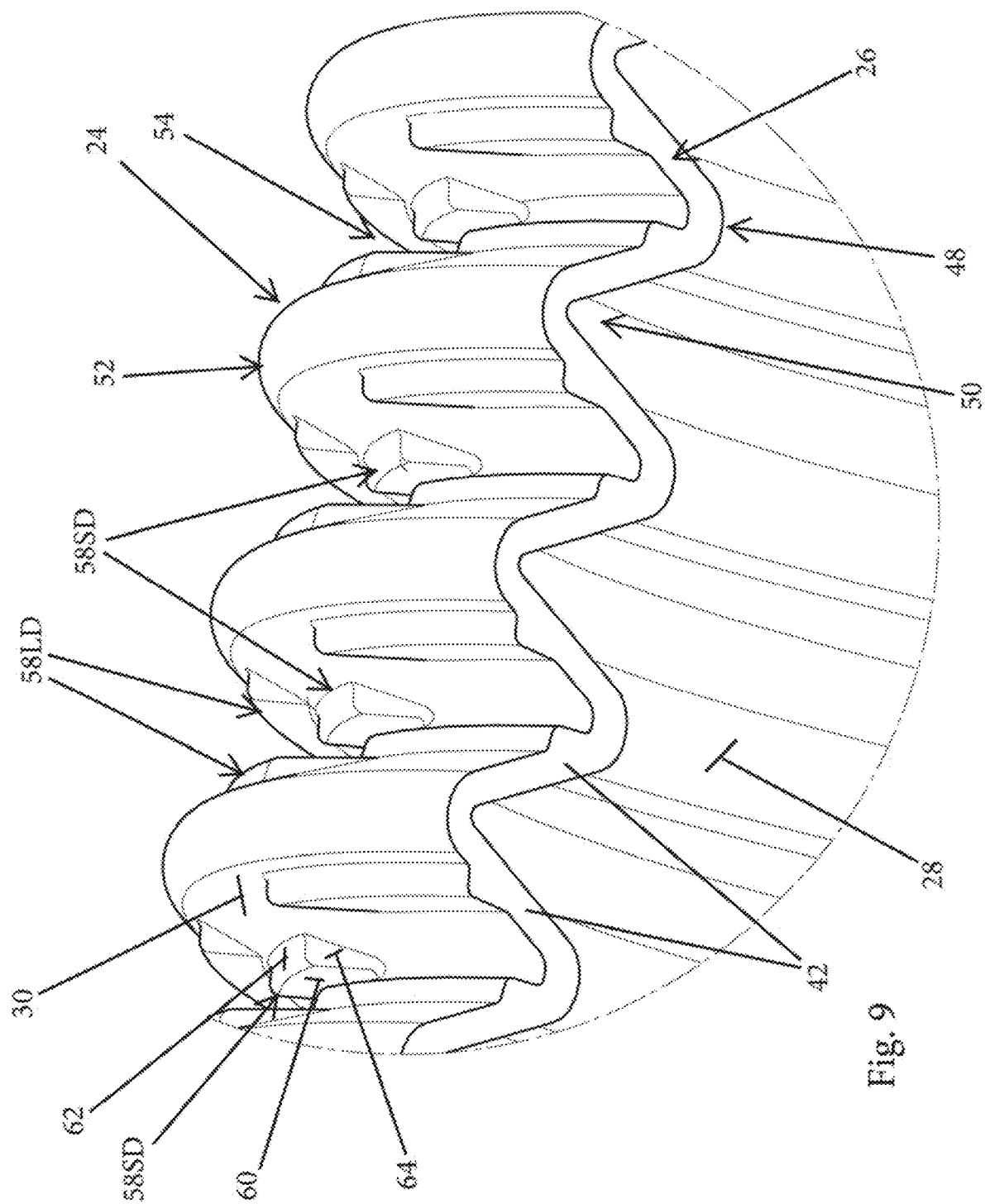
FIG. 9 is a detail enlarged view of the circled area designated by the numeral 9 in FIG. 8.
Figure 10:
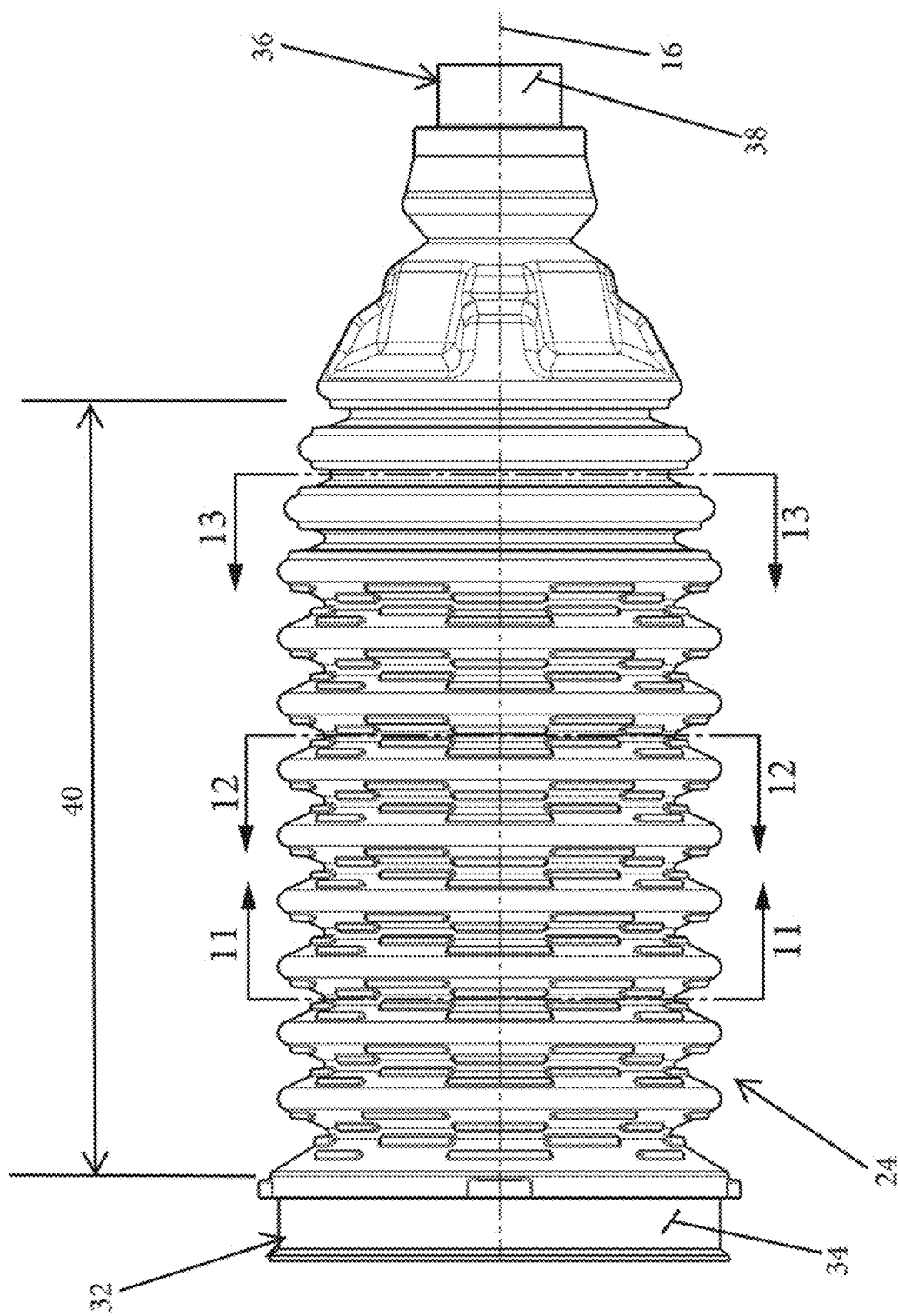
FIG. 10 is a side elevation view of the tie rod boot shown in FIG. 1.

Corresponding reference characters indicate corresponding parts throughout several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE PREFERRED EMBODIMENTS

Part of a steering assembly of a land vehicle is shown and generally designated in FIG. 1 by the numeral 10. Steering assembly 10 includes, as is known to those skilled in the art, a steering rack and pinion, gearbox or other mechanism 12 adapted to extend and retract a tie rod 14 therefrom along the longitudinal axis 16 of the tie rod as depicted by double sided arrow 18. As is also known, the outer terminal end 20 of the tie rod 14 is coupled to a steering knuckle (not shown), of a vehicle wheel whereby, by extending and retracting the tie rod 14, the wheel is rotated about a generally vertical steering axis for selectively turning the wheel in the left and right directions. Of course, a steering assembly 10 is provided on both the left and right sides of the vehicle for turning the respective left and right wheels of the vehicle and steering the vehicle in the desired direction.

A tie rod boot 22 is provided, in accordance with the principles of the present invention, for protecting the inner portion (not shown) of the tie rod 14 which slidingly enters and exits the mechanism 12 thereby maintaining the steering assembly 10 in good working order and lengthening the life thereof. Boot 22 protects the inner portion of the tie rod 14 from the elements and prevents damage thereto from rocks and debris to which the steering assembly may be subjected. Advantageously, boot 22 resists impacts from larger rocks and debris and minimizes potential damaging holes therethough which eventually allow water and other debris to enter the boot 22 and damage the tie rod 14 and mechanism 12. Furthermore, boot 22 requires minimal longitudinal forces for extending and retracting as the tie rod 14 as it is extended and retraced thereby minimally interfering with the operation of the steering assembly 10.

Figure 17:
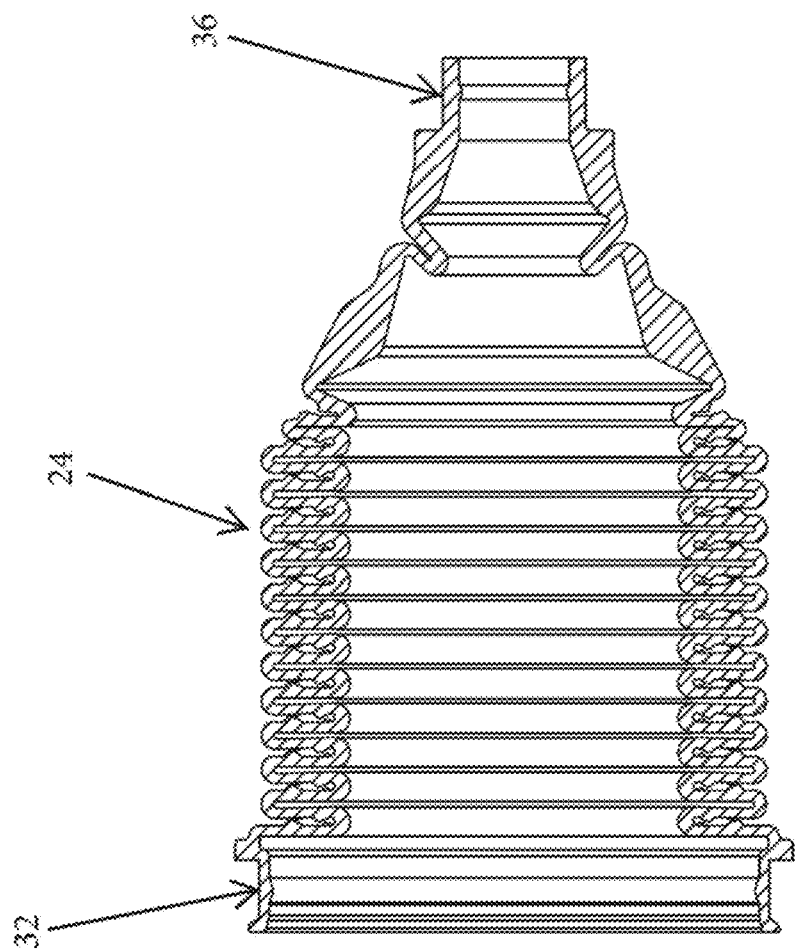
FIG. 17 is a cross section view similar to FIG. 16 but showing the tie rod boot in its fully retracted state.
Figure 18:
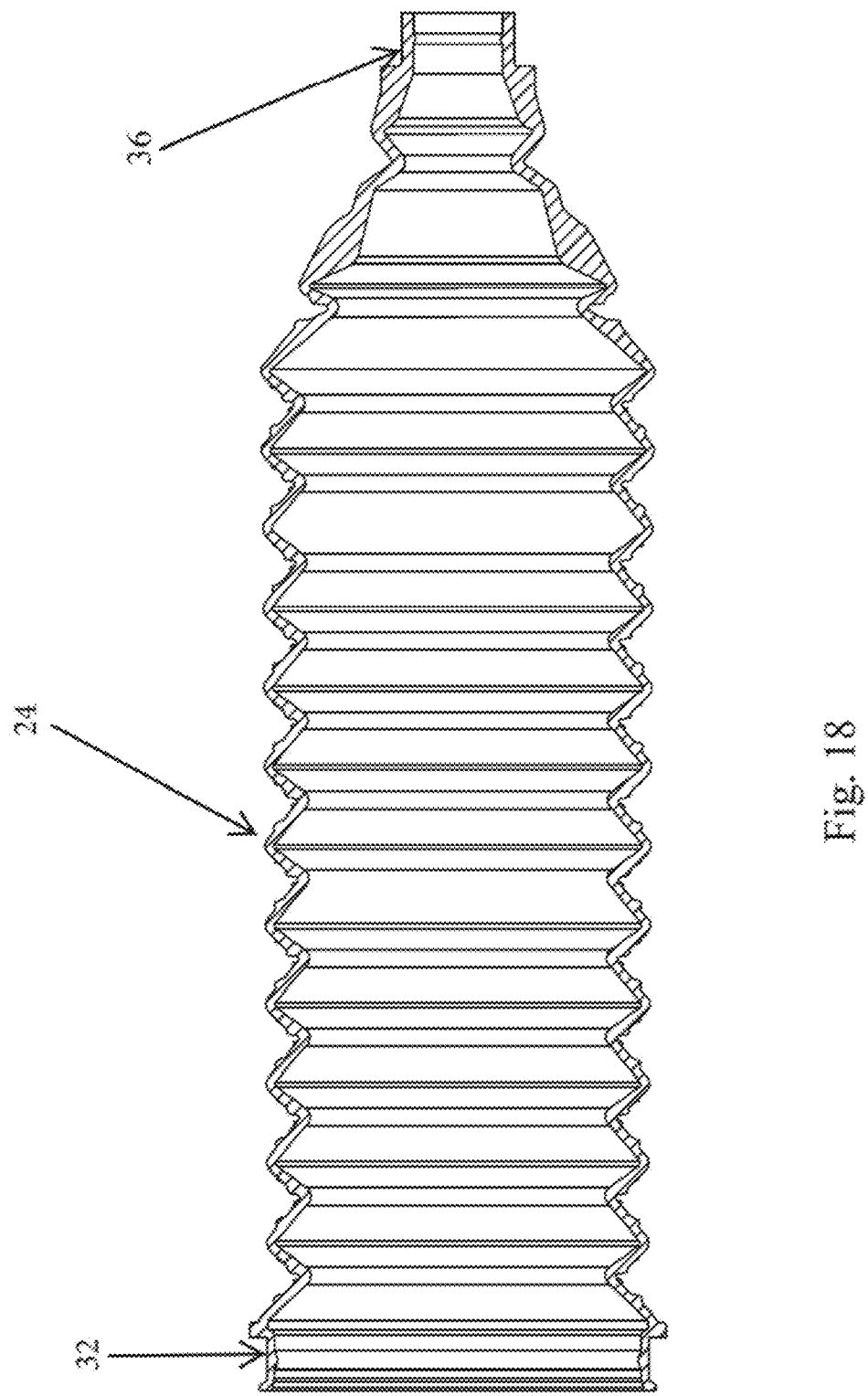
FIG. 18 is a cross section view similar to FIG. 16 but showing the tie rod boot in its fully extended state.
Figure 19:
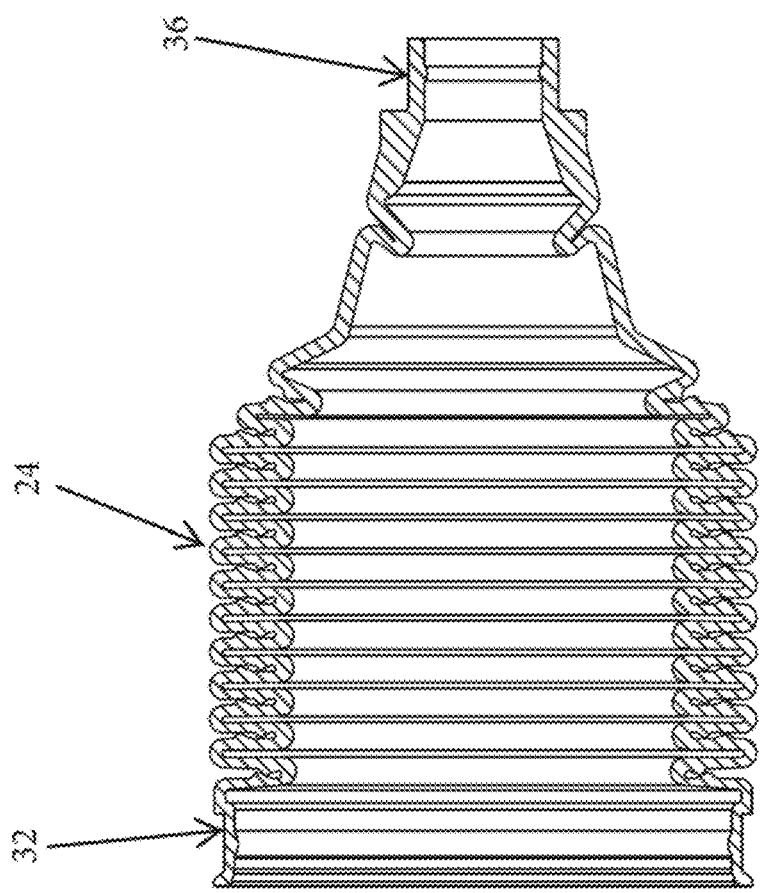
FIG. 19 is a cross section view similar to FIG. 15 but showing the tie rod boot in its fully retracted state.
Figure 20:
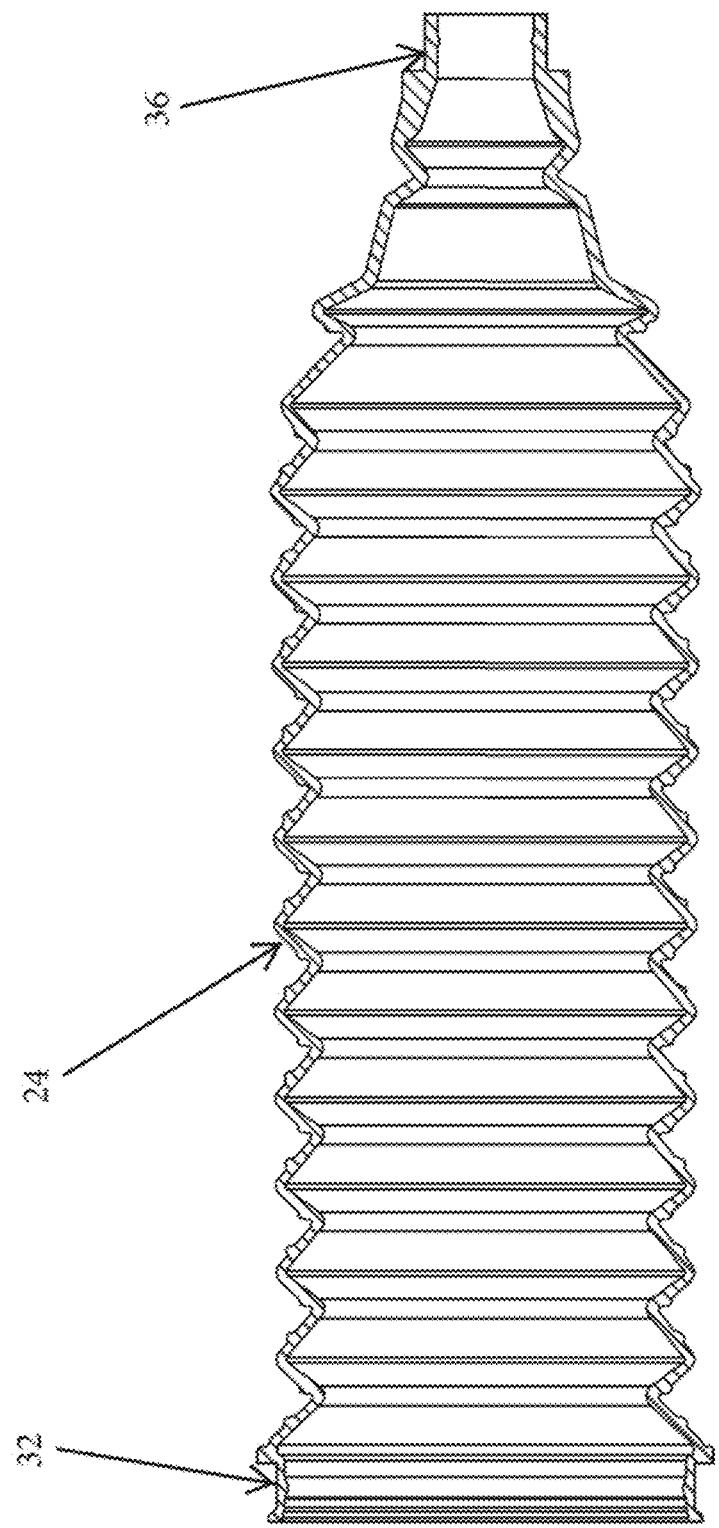
FIG. 20 is a cross section view similar to FIG. 15 but showing the tie rod boot in its fully extended state; and, FIG. 21 is a diagrammatic cross section view of a two part clamp mold surrounding the tie rod boot and a central mandrel within the tie rod boot depicting the method of injection molding the tie rod boot.

Referring now to FIGS. 2-20, tie rod boot 22 includes a cylindrical tubular body 24 extending about a longitudinal axis which, when assembled in the steering assembly 10 as shown in FIG. 1, is collinear with the tie rod longitudinal axis 16. The tie rod longitudinal axis 16 is hereafter also referenced as the boot 22 longitudinal axis. Tubular body 24 is formed by a wall 26 which is injection molded and is made of rubber, plastic, or other suitable flexible materials that can be injection molded. Tubular wall 24 is injection molded in its neutral state as shown in FIGS. 1-16 whereby it can be extended as shown in FIGS. 18 and 20 and retracted/compressed as shown in FIGS. 17 and 19. Wall 26 is defined by an inner surface 28 and an outer surface 30 and is 1.25 mm to 1.75 mm thick depending on material properties and location along the tube 24.

The tubular body 24 includes, at one terminal end thereof, a steering mechanism attachment ring 32 for securing the tubular body 24 to the steering rack and pinion, gearbox or other mechanism 12. The inner annular surface of the steering mechanism attachment ring 32 is adapted to fit over a cylindrical section (not shown) of the steering rack and pinion, gearbox or other mechanism 12. The outer surface 34 of the steering mechanism attachment ring 32 includes an annular flat whereat a ring clamp (not shown) is provided for securing the steering mechanism attachment ring 32, in a known and customary manner, to the steering rack and pinion, gearbox or other mechanism 12.

At its other terminal end, the tubular body 24 includes a tie rod attachment ring 36 for securing the tubular body 24 to the tie rod 14. The inner annular surface of the tie rod ring attachment ring 36 is adapted to fit over a cylindrical section of the tie rod 14 as shown in FIG. 1. The outer surface 38 of the tie rod attachment ring includes an annular flat whereat a ring clamp (not shown) is provided for securing the tie rod attachment ring 36, in a known and customary manner, to the tie rod 14.

Accordingly, as the tie rod 14 is extended from the mechanism 12, the attachment rings 32, 36 are longitudinally pulled apart from each other thereby placing a tension force on the tubular body 24 and causing it to expand longitudinally as shown in FIGS. 18 and 20. Similarly, as the tie rod 14 is retracted into the mechanism 12, the attachment rings 32, 36 are pushed longitudinally towards each other thereby placing a compressive force on the tubular body 24 and causing it to retract longitudinally as shown in FIGS. 17 and 19.

Figure 15:
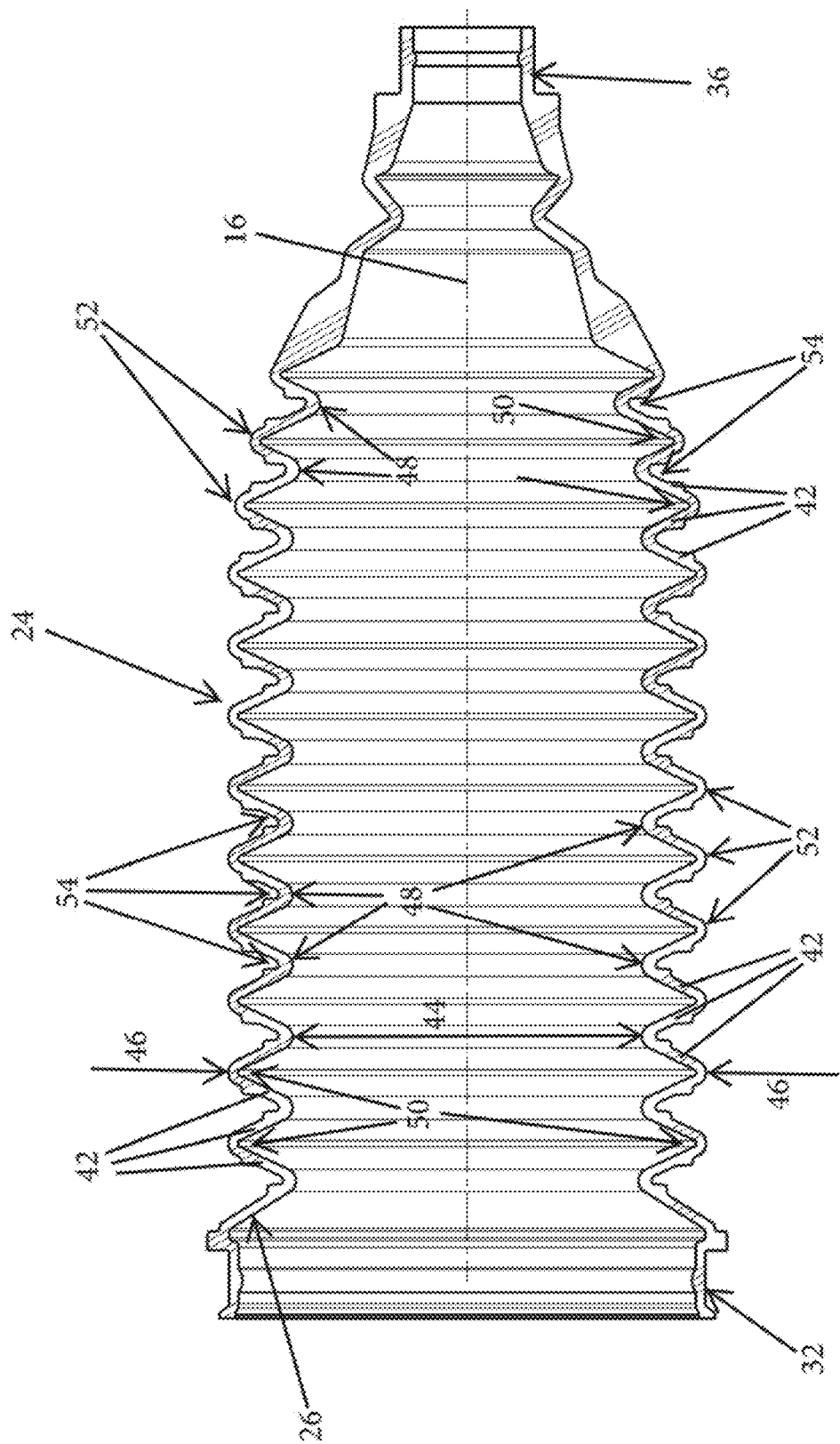
FIG. 15 is a cross section view of the tie rod boot shown in FIG. 14 taken along line 14-14 and showing the tie rod boot in its neutral state.
Figure 16:
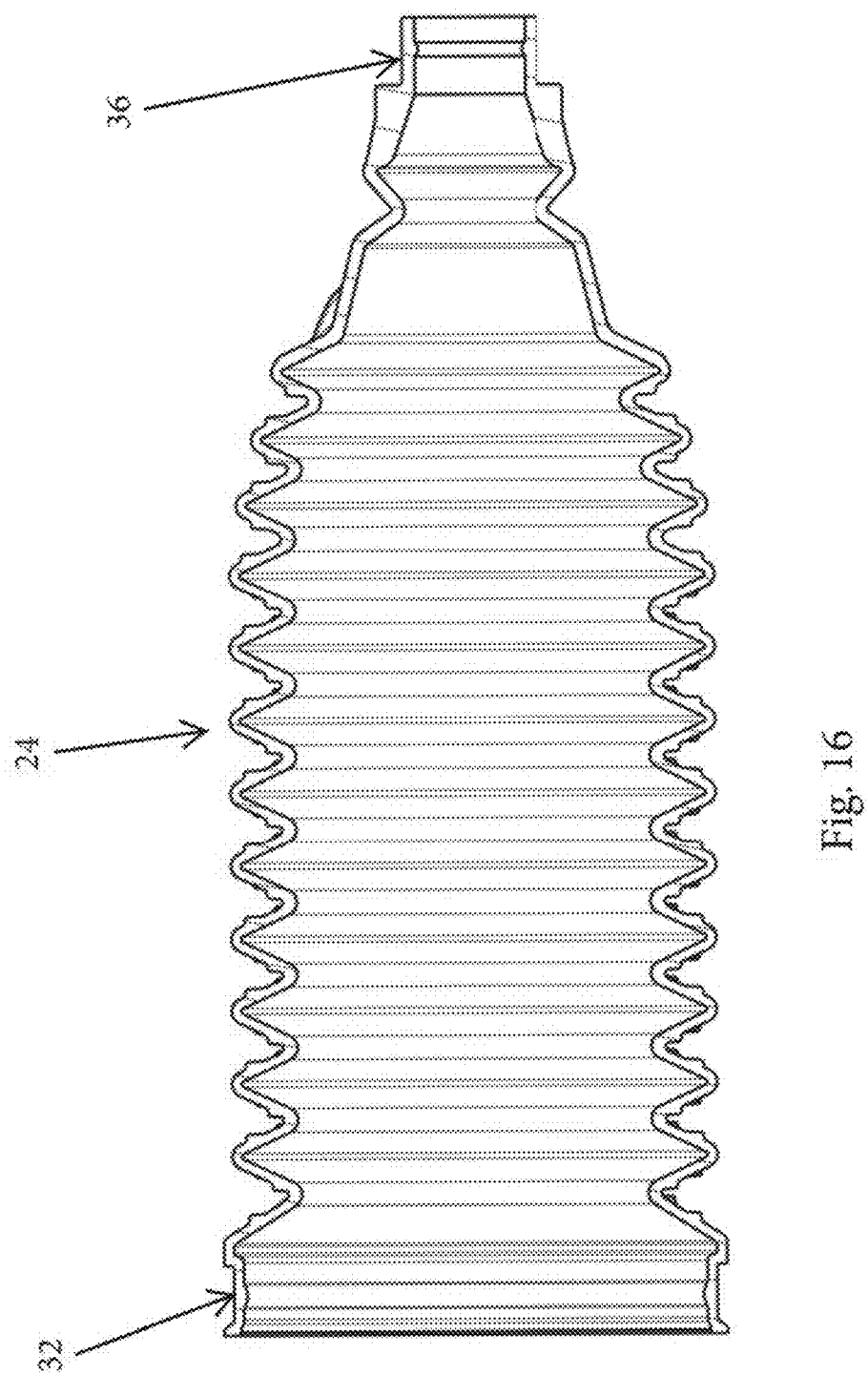
FIG. 16 is a cross section view of the tie rod boot shown in FIG. 14 taken along line 14-14 and showing the tie rod boot in its neutral state.

In order for the tubular body 24 to longitudinally expand and retract with minimal tensile and compressive forces, the tubular body 24 includes a tubular accordion shaped bellows section 40 between the attachment rings 32, 36. Referring more particularly to FIG. 15, the wall 26 in bellows section 40 is formed with a plurality of longitudinally aligned annulus shaped walls (ring disks) 42 having a minor diameter 44 and a major diameter 46 extending perpendicular from the longitudinal axis 16. Pairs of adjacent annulus walls 42 are joined at their minor diameter 44 thereby forming, as viewed from the interior of the tubular body 24, annular peaks 48 and annular valleys 50. Similarly, pairs of adjacent annulus walls 42 are joined at their major diameter 46 thereby forming, as viewed from the exterior of the tubular body 24, annular peaks 52 and annular valleys 54. Accordingly, the tubular wall 26 in the bellows section 40 is shaped having alternating longitudinally extending annular peaks 48, 52 and annular valleys 50, 54 with the annulus walls 42 extending between the peaks 48/valleys 54 and the peaks 52/valleys 50. Of course, the bellows section 40 is injection molded and the annulus walls 42 are integrally formed and connected to each other at their minor diameters 44 and their major diameters 46 as shown and described.

The thickness of the annulus walls 42 and the integral connections at the peaks 48/valleys 54 and the peaks 52/valleys 50 therebetween are maintained as thin as possible so as to minimize materials costs and so as to minimize the compressive and tension forces described herein above required to longitudinally retract and extend the tubular body bellows section 40. Additionally, so as to resist impacts from rocks and debris and minimize potential damaging holes through the annulus walls 42 while still minimizing materials and manufacturing costs and, further, allowing the bellows section 40 to be fully extended and retracted as shown in FIGS. 17-20, the annulus walls 42 are provided with a plurality of strategically located and shaped protuberances 56. The protuberances 56 are preferably located on the exterior surfaces 30 of the annulus walls 42, although it is contemplated that they could also be located on the interior surfaces 28 thereof, or both.

Protuberances 56 can be annular step shaped protuberance rings protruding from the outer surface 30 of the annulus walls 42 wherein, for each pair of annulus walls 42 facing each other and forming an exterior valley 54, a larger diameter protuberance ring 58L is provided on one annulus wall 42 surface 30 and a smaller diameter protuberance ring 58S is provided on the other opposing annulus wall 42 surface 30. Protuberance step shaped rings 58L, 58S are defined by a riser surface 60 which is in a plane generally perpendicular to the longitudinal axis 16 and a tread annular surface 62 which is parallel with the longitudinal axis 16 when the tubular body 24 is in its neutral state as shown in FIGS. 1-16. The diameter of the tread annular surface 62 of the smaller protuberance ring 58S is smaller than the riser surface 60 and tread annular surface 62 of the larger protuberance ring 58L whereby, when the tubular body 24 is retracted and the opposing annulus walls 42 are collapsed towards each other, the protuberance rings 58L, 58S nest with each other and the riser surfaces 60 of each protuberance ring 58L, 58S contacts the surface 30 of the opposing annulus wall 42.

Figure 11:
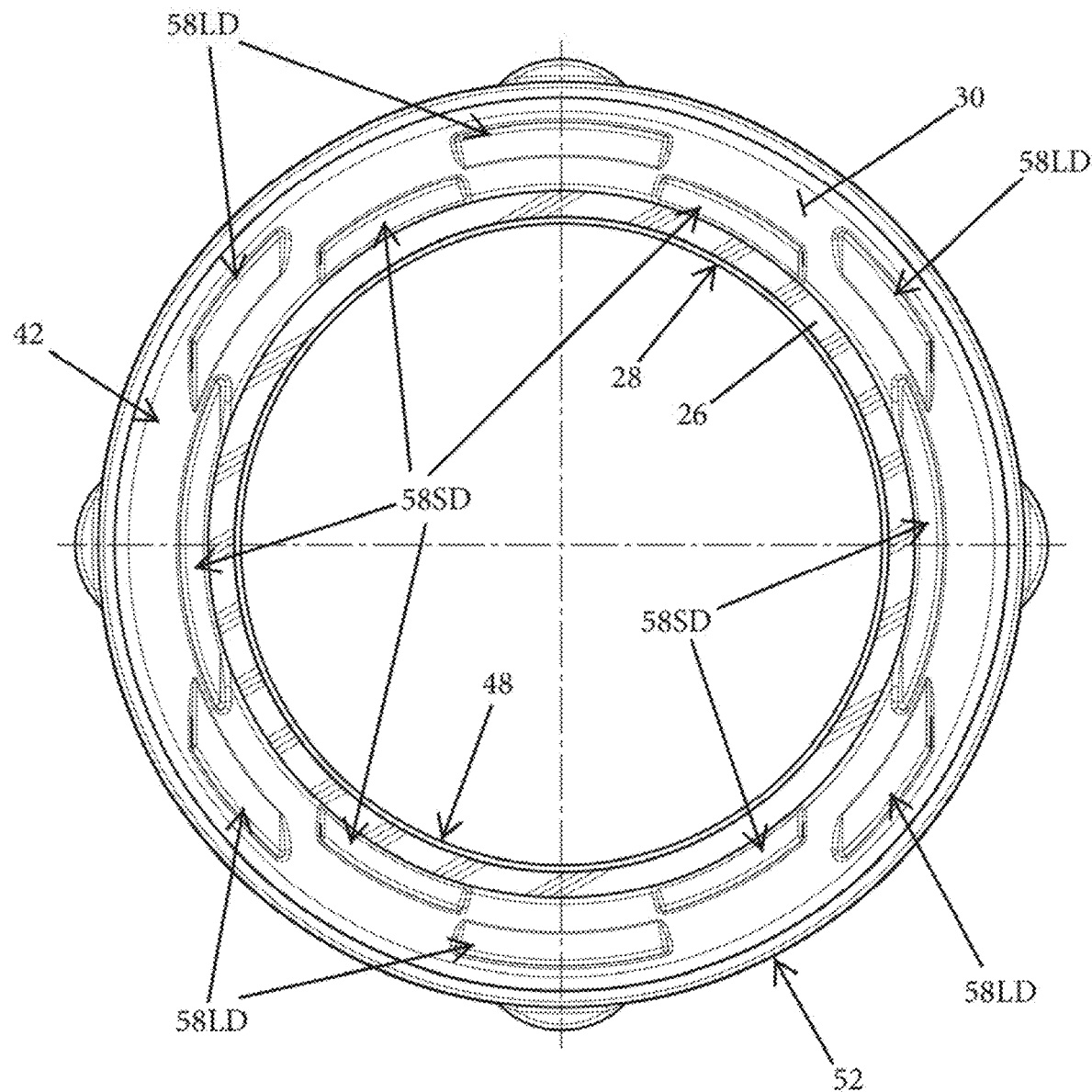
FIG. 11 is a cross section view of the tie rod boot shown in FIG. 10 taken along line 11-11.
Figure 12:
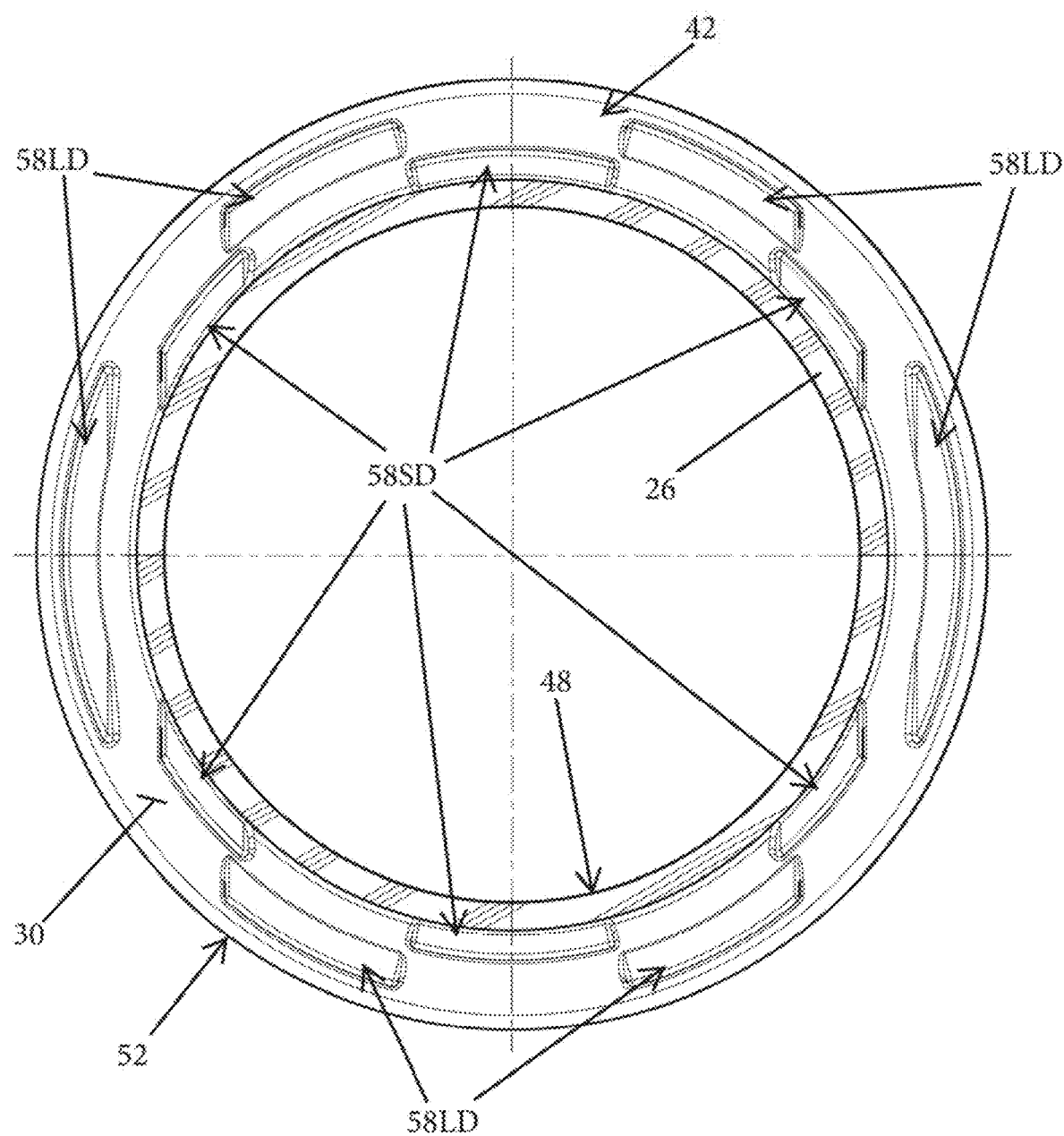
FIG. 12 is a cross section view of the tie rod boot shown in FIG. 10 taken along line 12-12.
Figure 13:
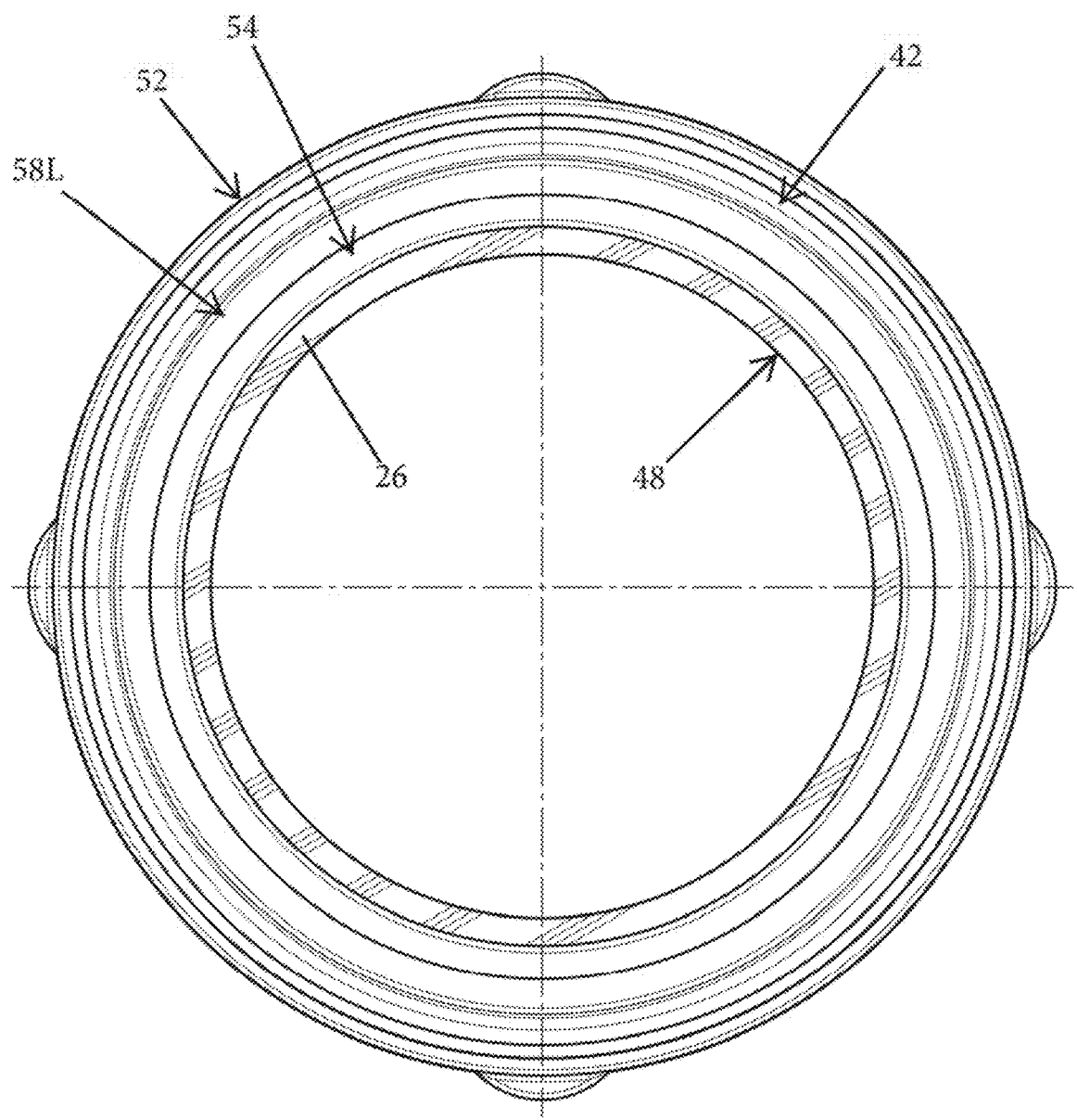
FIG. 13 is a cross section view of the tie rod boot shown in FIG. 10 taken along line 13-13.
Figure 14:
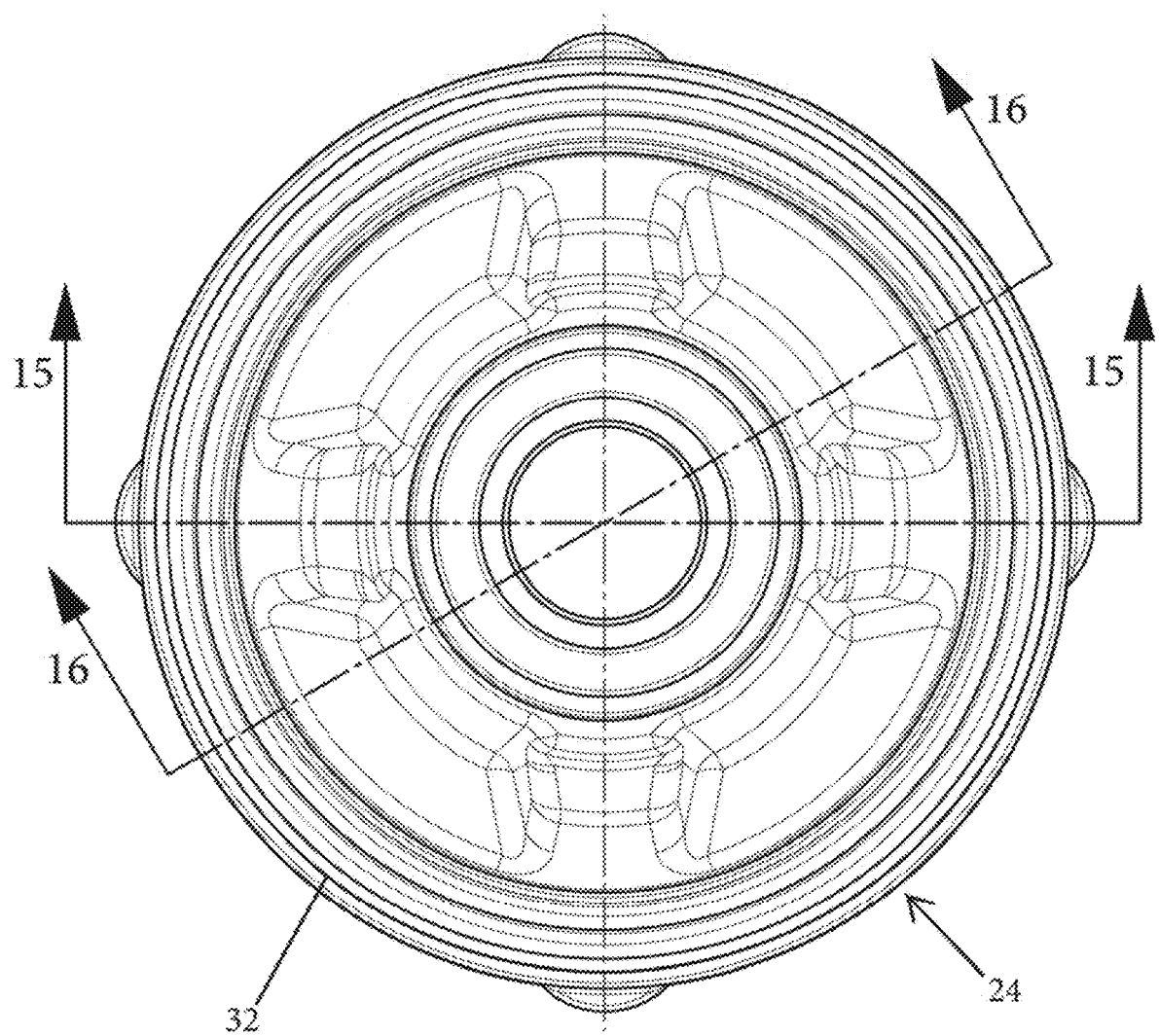
FIG. 14 is a side end view of the tie rod boot shown in FIG. 1.

Additionally, the larger diameter protuberance ring 58L can be discrete step protuberances 58LD and the smaller diameter protuberances 58S can be discontinuous discrete step protuberances 58SD. As best seen in FIGS. 11 and 12, for each pair of annulus walls 42 facing each other and forming an exterior valley 54, preferably six (6) larger diameter discrete step protuberances 58LD are formed on each annulus wall 42 surface 30 spaced circumferentially in increments of approximately 60° about the longitudinal axis 16. Each larger diameter discrete step protuberance 58LD is defined by a riser surface 60 which is in a plane generally perpendicular to the longitudinal axis 16 and a tread annular surface 62 which is parallel with the longitudinal axis 16 when the tubular body 24 is in its neutral state as shown in FIGS. 1-16. Each larger diameter discrete step protuberance 58LD radial terminal end is defined by a triangular shaped stringer surface 64 which is in a plane perpendicular to a plane 66 (FIG. 21) which is coplanar with the longitudinal axis 16. The larger diameter discrete step protuberances 58LD on one of the annulus walls 42 is shifted circumferentially approximately 30° from the larger diameter discrete step protuberances 58LD on the opposing annulus walls 42 (the protuberances 58LD in FIG. 11 are shifted circumferentially approximately 30° from the protuberances 58LD in FIG. 12) so that, when the tubular body 24 is retracted and the opposing annulus walls 42 are collapsed towards each other, the larger diameter discrete step protuberances 58LD nest with each other radially and circumferentially and the riser surfaces 60 of each discrete step protuberance 58LD contacts the surface 30 of the opposing annulus wall 42.

Similarly, for each pair of annulus walls 42 facing each other and forming an exterior valley 54, preferably six (6) smaller diameter discrete step protuberances 58SD are formed on each annulus wall 42 surface 30 spaced circumferentially in increments of approximately 60° about the longitudinal axis 16. Each smaller diameter discrete step protuberance 58SD is defined by a riser surface 60 which is in a plane generally perpendicular to the longitudinal axis 16 and a tread annular surface 62 which is parallel with the longitudinal axis 16 when the tubular body 24 is in its neutral state as shown in FIGS. 1-16. Each smaller diameter discrete step protuberance 58SD radial terminal end is defined by a triangular shaped stringer surface 64 which is in a plane perpendicular to a plane 66 (FIG. 21) which is coplanar with the longitudinal axis 16. The smaller diameter discrete step protuberances 58SD on one of the annulus walls 42 are shifted circumferentially approximately 30° from the smaller diameter discrete step protuberances 58SD on the opposing annulus walls 42 (the protuberances 58SD in FIG. 11 are shifted circumferentially approximately 30° from the protuberances 58SD in FIG. 12) so that, when the tubular body 24 is retracted and the opposing annulus walls 42 are collapsed towards each other, the smaller diameter discrete step protuberances 58SD nest with each other radially and circumferentially and the riser surfaces 60 of each discrete step protuberance 58SD, contacts the surface 30 of the opposing annulus wall 42.

Figure 21:
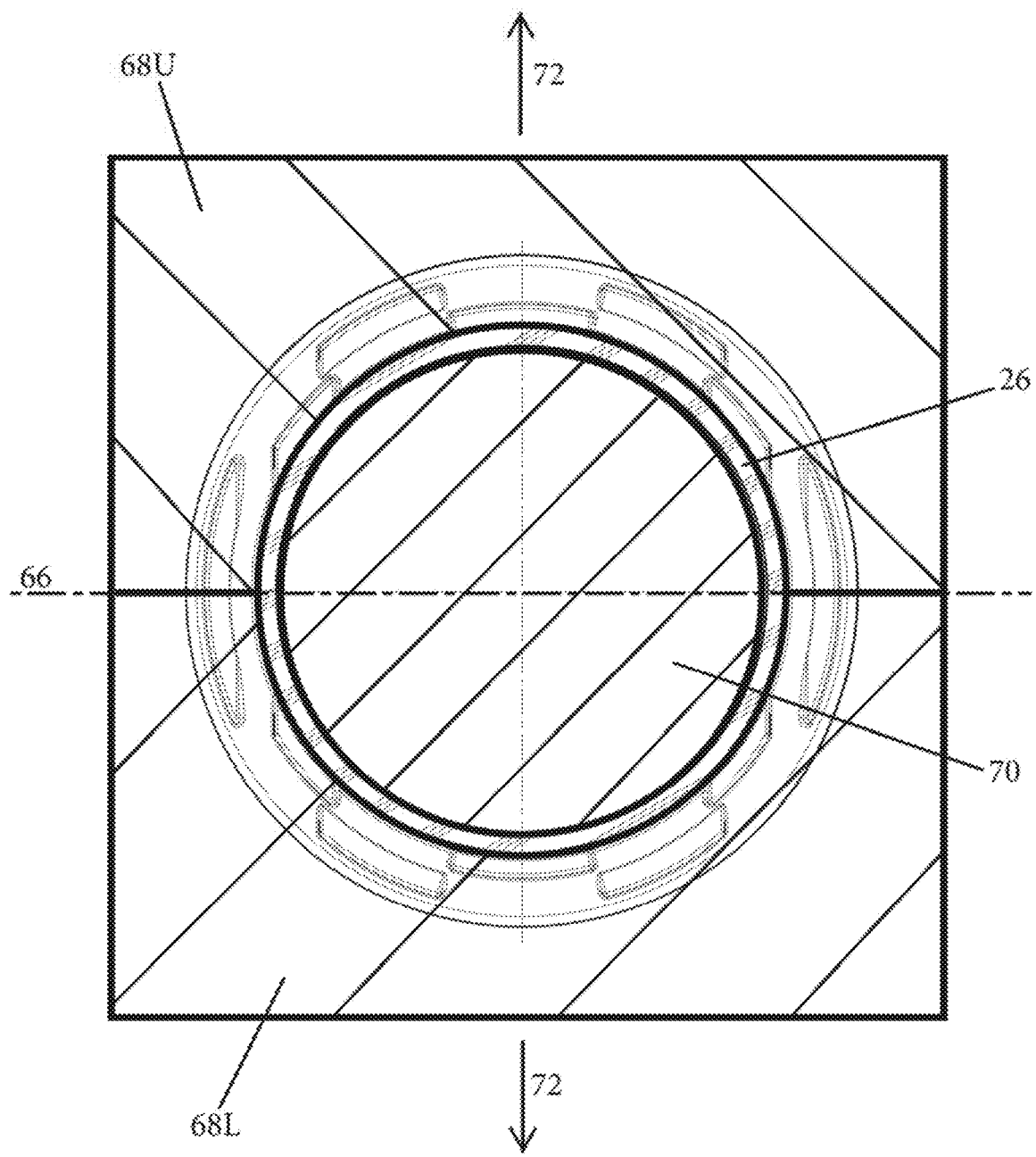

As mentioned herein above, the tubular body 24 is advantageously economically injection molded in its neutral state, as diagrammatically depicted in FIG. 21, with a clamp mold comprising upper and lower mold halves 68U, 68L and a central mandrel 70. After injecting the rubber or other flexible material into the closed mold as depicted in FIG. 21, the upper and lower mold halves 68U and 68L can readily be removed with ease because the riser surfaces 60 of all the protuberances 56 and the stringer surfaces 64 of all the discrete step protuberances 58LD and 58SD are substantially parallel with the direction of travel of the mold halves 68U, 68L as depicted by arrows 72 extending perpendicular to the central plane 66.

As should now be appreciated, the tie rod boot 22 constructed in accordance with the principles of the present invention protects the tie rod 14 from the elements and prevents damage thereto from rocks and debris by providing protuberances which resist impacts from rocks and other debris and which minimize potential damaging holes therethough and, further, requires minimal longitudinal forces for extending and retracting from its neutral state and is economically injection molded.

While this invention has been described as having an exemplary design, the present invention may be further modified within the spirit and scope of this disclosure. This application is therefore intended to cover any variations, uses, or adaptations of the invention using its general principles.

What is claimed is:

1. A tie rod boot comprising:
    a cylindrical tubular body including a bellows section between longitudinal terminal ends;
    a steering mechanism attachment ring at the cylindrical tubular body one longitudinal terminal end;
    a tie rod attachment ring at the cylindrical tubular body other one longitudinal terminal end;
    wherein the cylindrical tubular body comprises a plurality of annulus walls having a minor diameter and a major diameter, wherein pairs of adjacent annulus walls are joined at their minor diameter and pairs of adjacent annulus walls are joined at their major diameter thereby forming a tubular bellows with alternating annular peaks and annular valleys with the annulus walls extending between the peaks and valleys;
    a first ring shaped protuberance on a first annulus wall;
    a second ring shaped protuberance on a second annulus wall which is adjacent to and opposing the first annulus wall; and,
    wherein the first ring shaped protuberance is smaller in diameter than the second ring shaped protuberance whereby, when the cylindrical tubular body is longitudinally retracted and the first and second annulus walls are collapsed towards each other, the first ring shaped protuberance contacts the second annulus wall, the second ring shaped protuberance contacts the first annulus wall and the first ring shaped protuberance nests with the second ring shaped protuberance.

2. The tie rod boot of claim 1 wherein, when the cylindrical tubular body is in a neutral state, the first and second ring shaped protuberances are step shaped and are defined by a riser surface in a plane substantially perpendicular to a longitudinal axis of the cylindrical tubular body and a tread annular surface substantially parallel with the longitudinal axis.

3. The tie rod boot of claim 2 wherein the major diameter of the first annulus wall is smaller than the major diameter of the second annulus wall.

4. The tie rod boot of claim 1 wherein the major diameter of the first annulus wall is smaller than the major diameter of the second annulus wall.

5. A tie rod boot comprising:
a cylindrical tubular body including a bellows section between longitudinal terminal ends;
a steering mechanism attachment ring at the cylindrical tubular body one longitudinal terminal end;
a tie rod attachment ring at the cylindrical tubular body other one longitudinal terminal end;
wherein the cylindrical tubular body comprises a plurality of annulus walls having a minor diameter and a major diameter, wherein pairs of adjacent annulus walls are joined at their minor diameter and pairs of adjacent annulus walls are joined at their major diameter thereby forming a tubular bellows with alternating annular peaks and annular valleys with the annulus walls extending between the peaks and valleys;
a first ring of discrete protuberances on a first annulus wall;
a second ring of discrete protuberance on a second annulus wall which is adjacent to and opposing the first annulus wall;
wherein the first ring of discrete protuberances is defined by a first diameter and the second ring of discrete protuberances is defined by a second diameter which is substantially the same as the first diameter; and,
wherein the first ring of discrete protuberances are circumferentially shifted relative to the second ring of discrete protuberances whereby, when the cylindrical tubular body is longitudinally retracted and the first and second annulus walls are collapsed towards each other, the first ring of discrete protuberances contacts the second annulus wall, the second ring of discrete protuberances contacts the first annulus wall and the protuberances of the first ring discrete protuberances nest with the protuberances of the second ring of discrete protuberances.

6. The tie rod boot of claim 5 wherein, when the cylindrical tubular body is in a neutral state, the discrete protuberances are step shaped and are defined by a riser surface in a plane substantially perpendicular to a longitudinal axis of the cylindrical tubular body and a tread annular surface substantially parallel with the longitudinal axis.

7. The tie rod boot of claim 6 wherein each discrete protuberance terminates in a surface which is in a plane substantially perpendicular to the longitudinal axis.

8. The tie rod boot of claim 5 further comprising:
a third ring of discrete protuberances on the first annulus wall;
a fourth ring of discrete protuberance on the second annulus wall which is adjacent to and opposing the first annulus wall;
wherein the third ring of discrete protuberances is defined by a third diameter and the fourth ring of discrete protuberances is defined by a fourth diameter which is substantially the same as the third diameter;
wherein the third and fourth diameters are smaller than the first and second diameters; and,
wherein the third ring of discrete protuberances are circumferentially shifted relative to the fourth ring of discrete protuberances whereby, when the cylindrical tubular body is longitudinally retracted and the first and second annulus walls are collapsed towards each other, the third ring of discrete protuberances contacts the second annulus wall, the fourth ring of discrete protuberances contacts the first annulus wall and the protuberances of the third ring of discrete protuberances nest with the protuberances of the fourth ring of discrete protuberances.

9. The tie rod boot of claim 8 wherein, when the cylindrical tubular body is in a neutral state, the discrete protuberances are step shaped and are defined by a riser surface in a plane substantially perpendicular to a longitudinal axis of the cylindrical tubular body and a tread annular surface substantially parallel with the longitudinal axis.

10. The tie rod boot of claim 9 wherein each discrete protuberance terminates in a surface which is in a plane substantially perpendicular to the longitudinal axis.

11. A tie rod boot comprising:
a cylindrical tubular body including a bellows section between longitudinal terminal ends;
a steering mechanism attachment ring at the cylindrical tubular body one longitudinal terminal end;
a tie rod attachment ring at the cylindrical tubular body other one longitudinal terminal end;
wherein the cylindrical tubular body comprises a plurality of annulus walls having a minor diameter and a major diameter, wherein pairs of adjacent annulus walls are joined at their minor diameter and pairs of adjacent annulus walls are joined at their major diameter thereby forming a tubular bellows with alternating annular peaks and annular valleys with the annulus walls extending between the peaks and valleys;
wherein a first section of the cylindrical tubular wall comprises:
a) a first ring shaped protuberance on a first annulus wall;
b) a second ring shaped protuberance on a second annulus wall which is adjacent to and opposing the first annulus wall; and,
c) wherein the first ring shaped protuberance is smaller in diameter than the second ring shaped protuberance whereby, when the cylindrical tubular body is longitudinally retracted and the first and second annulus walls are collapsed towards each other, the first ring shaped protuberance contacts the second annulus wall, the second ring shaped protuberance contacts the first annulus wall and the first ring shapes protuberance nests with the second ring shaped protuberance;
wherein a second section of the cylindrical tubular wall comprises:
a) a first ring of discrete protuberances on a first annulus wall;
b) a second ring of discrete protuberance on a second annulus wall which is adjacent to and opposing the first annulus wall;
c) wherein the first ring of discrete protuberances is defined by a first diameter and the second ring of discrete protuberances is defined by a second diameter which is substantially the same as the first diameter; and,
d) wherein the first ring of discrete protuberances are circumferentially shifted relative to the second ring of discrete protuberances whereby, when the cylindrical tubular body is longitudinally retracted and the first and second annulus walls are collapsed towards each other, the first ring of discrete protuberances contacts the second annulus wall, the second ring of discrete protuberances contacts the first annulus wall and the protuberances of the first ring of discrete protuberances nest with the protuberances of the second ring of discrete protuberances.

12. The tie rod boot of claim 11 wherein, when the cylindrical tubular body is in a neutral state, the first and second ring shaped protuberances and the first and discrete protuberances are step shaped and are defined by a riser surface in a plane substantially perpendicular to a longitudinal axis of the cylindrical tubular body and a tread annular surface substantially parallel with the longitudinal axis.

13. The tie rod boot of claim 12 wherein each discrete protuberance terminates in a surface which is in a plane substantially perpendicular to the longitudinal axis.

14. The tie rod boot of claim 11 wherein the second section of the cylindrical tubular wall further comprises:
   a third ring of discrete protuberances on the first annulus wall;
   a fourth ring of discrete protuberance on the second annulus wall which is adjacent to and opposing the first annulus wall;
   wherein the third ring of discrete protuberances is defined by a third diameter and the fourth ring of discrete protuberances is defined by a fourth diameter which is substantially the same as the third diameter;
   wherein the third and fourth diameters are smaller than the first and second diameters; and,
   wherein the third ring of discrete protuberances are circumferentially shifted relative to the fourth ring of discrete protuberances whereby, when the cylindrical tubular body is longitudinally retracted and the first and second annulus walls are collapsed towards each other, the third ring of discrete protuberances contacts the second annulus wall, the fourth ring of discrete protuberances contacts the first annulus wall and the protuberances of the third ring of discrete protuberances nest with the protuberances of the fourth ring of discrete protuberances.

15. The tie rod boot of claim 14 wherein, when the cylindrical tubular body is in a neutral state, the first and second ring shaped protuberances and the discrete protuberances are step shaped and are defined by a riser surface in a plane substantially perpendicular to a longitudinal axis of the cylindrical tubular body and a tread annular surface substantially parallel with the longitudinal axis.

16. The tie rod boot of claim 1 wherein each discrete protuberance terminates in a surface which is in a plane substantially perpendicular to the longitudinal axis.

* * * * *

UNITED STATES PATENT AND TRADEMARK OFFICE
CERTIFICATE OF CORRECTION

| | |
|---|---|
| PATENT NO. | : 11,415,179 B2 |
| APPLICATION NO. | : 16/540002 |
| DATED | : August 16, 2022 |
| INVENTOR(S) | : Robert K. Wagner et al. |

It is certified that error appears in the above-identified patent and that said Letters Patent is hereby corrected as shown below:

In the Claims

Claim 5, Column 9, Line 44, after "ring" insert --of--

Claim 16, Column 12, Line 23, delete "1" and insert --15--

Signed and Sealed this
Twenty-fifth Day of October, 2022

*Katherine Kelly Vidal*

Katherine Kelly Vidal
*Director of the United States Patent and Trademark Office*